United States Patent
Morris

(10) Patent No.: US 10,015,122 B1
(45) Date of Patent: *Jul. 3, 2018

(54) METHODS AND COMPUTER PROGRAM PRODUCTS FOR PROCESSING A SEARCH

(71) Applicant: Sitting Man, LLC, Raleigh, NC (US)

(72) Inventor: Robert Paul Morris, Raleigh, NC (US)

(73) Assignee: Sitting Man, LLC, Raleigh, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/803,822

(22) Filed: Nov. 5, 2017

Related U.S. Application Data

(63) Continuation-in-part of application No. 15/800,033, filed on Oct. 31, 2017, which is a continuation-in-part
(Continued)

(51) Int. Cl.
   *H04L 12/58* (2006.01)
   *H04L 29/12* (2006.01)
   (Continued)

(52) U.S. Cl.
   CPC ............ *H04L 51/046* (2013.01); *H04L 51/10* (2013.01); *G06F 3/04842* (2013.01);
   (Continued)

(58) Field of Classification Search
   CPC .................................................. H04L 51/046
   See application file for complete search history.

(56) References Cited

U.S. PATENT DOCUMENTS 6,192,394 B1    2/2001  Gutfreund et al.
6,346,952 B1 *  2/2002  Shtivelman ........... G06F 17/277
                                              707/999.005
(Continued)

FOREIGN PATENT DOCUMENTS

WO      2002077773 A3    6/2009

OTHER PUBLICATIONS

Berners-Lee, T, et al, "Uniform Resource Identifier (URI): Generic Syntax", RFC 3986, pp. 1-61, Jan. 2005, Internet Engineering Task Force (IEFT), http://www.ietf.org/rfc/rfc3986.txt.
(Continued)

*Primary Examiner* — Jimmy H Tran
(74) *Attorney, Agent, or Firm* — Patrick E. Caldwell, Esq.; The Caldwell Firm, LLC

(57) ABSTRACT

In one embodiment, method is provided, comprising: creating at least a portion of an instant messaging application that is configured to cooperate with a relay that is configured to communicate with a web service, the instant messaging application configured to cause a device to: display an instant messaging interface; receive, from the relay and utilizing a communications agent, a first message; display, via the instant messaging interface, at least a portion of the first message; send, to the relay, a second message including text and an automatically determined contactee identifier, for causing the relay to: send, from the relay to the web service, a third message including the text, for causing the web service to: send, to the relay, a fourth message with at least one image that is identified based on the text, for causing the relay to: send, to the device, a fifth message including the at least one image.

30 Claims, 12 Drawing Sheets

Related U.S. Application Data of application No. 14/274,623, filed on May 9, 2014, now abandoned, which is a continuation-in-part of application No. 13/654,647, filed on Oct. 18, 2012, now abandoned, and a continuation-in-part of application No. 13/716,156, filed on Dec. 16, 2012, now abandoned, and a continuation-in-part of application No. 13/716,159, filed on Dec. 16, 2012, now abandoned.

(51) Int. Cl.
G06F 3/0484 (2013.01)
H04L 29/08 (2006.01)

(52) U.S. Cl.
CPC .............. *H04L 51/02* (2013.01); *H04L 51/18* (2013.01); *H04L 61/1547* (2013.01); *H04L 67/02* (2013.01)

(56) References Cited

U.S. PATENT DOCUMENTS

| | | |
|---|---|---|
| 6,502,236 B1 | 12/2002 | Allen et al. |
| 6,996,599 B1 | 2/2006 | Anders et al. |
| 7,051,119 B2 | 5/2006 | Shafron et al. |
| 7,080,120 B2 | 7/2006 | Betros et al. |
| 7,130,883 B2 | 10/2006 | Zhu et al. |
| 7,133,897 B1 | 11/2006 | Tran |
| 7,209,953 B2 * | 4/2007 | Brooks ................ G06Q 10/107 709/206 |
| 7,328,239 B1 | 2/2008 | Berberian et al. |
| 7,421,069 B2 | 9/2008 | Vernon et al. |
| 7,426,578 B2 | 9/2008 | Jones et al. |
| 7,529,798 B2 | 5/2009 | Rust |
| 7,533,146 B1 | 5/2009 | Kumar |
| 7,567,553 B2 | 7/2009 | Morris |
| 7,613,772 B2 | 11/2009 | Bartram et al. |
| 7,623,650 B2 | 11/2009 | Dalton et al. |
| 7,624,148 B2 | 11/2009 | Dalen |
| 7,653,668 B1 | 1/2010 | Shelat et al. |
| 7,680,950 B1 | 3/2010 | Slaughter et al. |
| 7,701,882 B2 | 4/2010 | Jones et al. |
| 7,757,265 B2 | 7/2010 | Reynolds et al. |
| 7,765,581 B1 | 7/2010 | Caronni et al. |
| 7,783,718 B2 | 8/2010 | Modi |
| 7,809,709 B1 | 10/2010 | Harrison |
| 7,809,854 B2 | 10/2010 | Jung et al. |
| 7,822,818 B2 * | 10/2010 | Desouza ................ H04L 51/04 709/202 |
| 7,904,369 B1 | 3/2011 | Andreasen et al. |
| 7,949,722 B1 | 5/2011 | Ullman et al. |
| 7,953,853 B2 | 5/2011 | Christensen et al. |
| 8,020,190 B2 | 9/2011 | Plummer |
| 8,060,619 B1 | 11/2011 | Saulpaugh et al. |
| 8,214,329 B2 | 7/2012 | Gilder et al. |
| 8,224,298 B2 | 7/2012 | Smith et al. |
| 8,280,948 B1 | 10/2012 | Chen |
| 8,321,499 B2 | 11/2012 | Reisman |
| 8,332,654 B2 | 12/2012 | Anbuselvan |
| 8,359,361 B2 * | 1/2013 | Thornton ................ G06F 3/048 707/821 |
| 8,583,745 B2 | 11/2013 | Bearman et al. |
| 8,671,145 B2 | 3/2014 | Roskowski et al. |
| 8,683,576 B1 | 3/2014 | Yun |
| 8,719,251 B1 | 5/2014 | English et al. |
| 8,775,511 B2 | 7/2014 | Vernon et al. |
| 8,812,733 B1 | 8/2014 | Black et al. |
| 8,824,643 B2 | 9/2014 | Sahai |
| 8,849,914 B2 | 9/2014 | Bove et al. |
| 8,868,667 B2 * | 10/2014 | Gorecha ................ G06Q 10/10 709/204 |
| 8,909,710 B2 | 12/2014 | Blackstock et al. |
| 8,949,340 B2 | 2/2015 | Smith et al. |
| 8,996,658 B2 | 3/2015 | Anbuselvan |
| 9,053,203 B2 | 6/2015 | Wilson et al. |
| 9,116,615 B2 * | 8/2015 | Ng ........................ G06F 3/0481 |
| 9,299,056 B2 | 3/2016 | Kallman et al. |
| 9,319,360 B2 * | 4/2016 | Shih ........................ H04L 51/06 |
| 9,524,531 B2 * | 12/2016 | Byrne .................... G06Q 10/10 |
| 9,584,343 B2 * | 2/2017 | Brezina ................ G06Q 10/107 |
| 9,584,566 B2 * | 2/2017 | Liu ........................ H04L 67/1095 |
| 2002/0087505 A1 | 7/2002 | Smith et al. |
| 2002/0087522 A1 | 7/2002 | MacGregor et al. |
| 2002/0143855 A1 | 10/2002 | Traversat et al. |
| 2002/0147840 A1 | 10/2002 | Mutton et al. |
| 2003/0172127 A1 | 9/2003 | Northrup et al. |
| 2003/0200268 A1 | 10/2003 | Morris |
| 2004/0015610 A1 | 1/2004 | Treadwell |
| 2004/0024754 A1 | 2/2004 | Mane et al. |
| 2004/0044727 A1 | 3/2004 | Abdelaziz et al. |
| 2004/0064478 A1 | 4/2004 | Canesi |
| 2004/0064511 A1 | 4/2004 | Abdel-Aziz et al. |
| 2004/0088347 A1 | 5/2004 | Yeager et al. |
| 2004/0117456 A1 * | 6/2004 | Brooks ................ G06Q 10/107 709/217 |
| 2004/0186894 A1 | 9/2004 | Jhingan et al. |
| 2005/0010646 A1 | 1/2005 | Shiina |
| 2005/0102348 A1 | 5/2005 | Parsons et al. |
| 2005/0114664 A1 | 5/2005 | Davin |
| 2005/0114671 A1 | 5/2005 | Little et al. |
| 2005/0223073 A1 | 10/2005 | Malik |
| 2006/0026248 A1 * | 2/2006 | Bauchot ................ G06Q 10/107 709/206 |
| 2006/0069787 A1 | 3/2006 | Sinclair et al. |
| 2006/0095531 A1 | 5/2006 | Cho |
| 2006/0224583 A1 | 10/2006 | Fikes et al. |
| 2006/0224608 A1 | 10/2006 | Zamir et al. |
| 2006/0224615 A1 | 10/2006 | Korn et al. |
| 2006/0224624 A1 | 10/2006 | Korn et al. |
| 2006/0224938 A1 | 10/2006 | Fikes et al. |
| 2006/0256934 A1 | 11/2006 | Mazor |
| 2007/0006028 A1 * | 1/2007 | Desouza ................ H04L 51/04 714/12 |
| 2007/0067726 A1 | 3/2007 | Flynt et al. |
| 2007/0078902 A1 | 4/2007 | Buschi et al. |
| 2007/0100713 A1 | 5/2007 | Favero et al. |
| 2007/0180150 A1 | 8/2007 | Eisner et al. |
| 2008/0005103 A1 | 1/2008 | Ratcliffe et al. |
| 2008/0016160 A1 | 1/2008 | Walter et al. |
| 2008/0059500 A1 | 3/2008 | Symens |
| 2008/0098075 A1 | 4/2008 | O'Bryan et al. |
| 2008/0155110 A1 | 6/2008 | Morris |
| 2008/0201364 A1 | 8/2008 | Buschi et al. |
| 2008/0256199 A1 | 10/2008 | Pesala |
| 2008/0320094 A1 | 12/2008 | Tu et al. |
| 2009/0157829 A1 | 6/2009 | Choi et al. |
| 2009/0157859 A1 | 6/2009 | Morris |
| 2009/0177526 A1 | 7/2009 | Aaltonen et al. |
| 2009/0177754 A1 * | 7/2009 | Brezina ................ G06Q 10/107 709/206 |
| 2009/0222450 A1 | 9/2009 | Zigelman |
| 2009/0254601 A1 | 10/2009 | Moeller et al. |
| 2009/0265426 A1 | 10/2009 | Svendsen et al. |
| 2009/0327904 A1 | 12/2009 | Guzak et al. |
| 2010/0011077 A1 | 1/2010 | Shkolnikov et al. |
| 2010/0070602 A1 | 3/2010 | Malik |
| 2010/0169442 A1 | 7/2010 | Liu et al. |
| 2010/0198922 A1 * | 8/2010 | Katis ........................ G06Q 10/00 709/206 |
| 2010/0235439 A1 | 9/2010 | Goodnow |
| 2010/0235726 A1 * | 9/2010 | Ording ................ G06F 1/1626 715/234 |
| 2010/0235793 A1 * | 9/2010 | Ording ................ G06F 1/1626 715/863 |
| 2010/0312782 A1 | 12/2010 | Li et al. |
| 2011/0072033 A1 | 3/2011 | White et al. |
| 2011/0087990 A1 * | 4/2011 | Ng ........................ G06F 3/04886 715/773 |
| 2011/0106617 A1 * | 5/2011 | Cooper ................ G06Q 30/02 705/14.49 |
| 2011/0138004 A1 | 6/2011 | McConn et al. |

(56) References Cited

U.S. PATENT DOCUMENTS

| | | | |
|---|---|---|---|
| 2011/0276637 A1* | 11/2011 | Thornton | H04L 51/08 709/206 |
| 2012/0011207 A1 | 1/2012 | Morris | |
| 2012/0011444 A1 | 1/2012 | Morris | |
| 2012/0290945 A1* | 11/2012 | Byrne | G06Q 50/32 715/752 |
| 2013/0046992 A1 | 2/2013 | Resch et al. | |
| 2013/0232205 A1* | 9/2013 | Gorecha | G06Q 10/10 709/206 |
| 2013/0275519 A1* | 10/2013 | Nichols | G06Q 10/107 709/206 |
| 2014/0006937 A1* | 1/2014 | Rainisto | G06F 17/211 715/255 |
| 2014/0089419 A1 | 3/2014 | Morris | |
| 2014/0089420 A1 | 3/2014 | Morris | |
| 2014/0089421 A1 | 3/2014 | Morris | |
| 2014/0095638 A1* | 4/2014 | Chen | H04L 51/04 709/206 |
| 2014/0108487 A1 | 4/2014 | Rosset et al. | |
| 2014/0112319 A1 | 4/2014 | Morris | |
| 2014/0172999 A1 | 6/2014 | Morris | |
| 2014/0279050 A1 | 9/2014 | Makar et al. | |
| 2014/0280603 A1* | 9/2014 | Rideout | H04W 4/21 709/205 |
| 2014/0379821 A1* | 12/2014 | Liu | H04L 67/1095 709/206 |
| 2015/0019994 A1* | 1/2015 | Freudenthaler | G06F 9/4445 715/748 |
| 2015/0200878 A1* | 7/2015 | Shih | H04L 51/046 709/206 |

OTHER PUBLICATIONS

Crocker, D, "Standard for the Format of ARPA Internet Text Messages", RFC 822, pp. 1-47, Aug. 1982, Internet Engineering Task Force (IEFT), http://www.ietf.org/rfc/rfc822.txt.

Fielding, R, et al, "Hypertext Transfer Protocol—HTIP/1.1", RFC 2616, pp. 1-114, Jun. 1999, Internet Engineering Task Force (IEFT), http://www.ietf.org/rfc/rfc2616.txt.

Freed, N, et al, "Multipurpose Internet Mail Extensions (MIME) Part 1: Format of Internet Message Bodies", RFC 2045, pp. 1-31, Nov. 1996, Internet Engineering Task Force (IEFT), http://www.ietf.org/rfc/rfc2045.txt.

Hoffman, P, et al, "The mailto URL scheme", RFC 2368, pp. 1-10, Jul. 1998, Internet Engineering Task Force (IEFT), http://www.ietf.org/rfc/rfc2368.txt.

Klensin, J, "Simple Mail Transfer Protocol", RFC 5321, pp. 1-95, Oct. 2008, Internet Engineering Task Force (IEFT), http://www.ietf.org/rfc/rfc5321.txt.

Myers, J, et al, "Post Office Protocol—version 3", RFC 1939, pp. 1-23, May 1996, Internet Engineering Task Force (IEFT), http://www.ietf.org/rfc/rfc1939.txt.

O. S. Goh, C. C. Fund and K. W. Wong, "VisualChat: A Visualization Tool for Human-Machine Interaction," 2008 IEEE/WIC/ACM International Conference on Web Intelligence and Intelligent Agent Technology, Sydney, NSW, 2008, pp. 131-134, available at http://ieeexplore.ieee.org/document/4740744/?reload=true.

Office Action Summary in U.S. Appl. No. 12/833,014 dated Aug. 2, 2012.

Office Action Summary in U.S. Appl. No. 12/833,016 dated Feb. 14, 2014.

Office Action Summary in U.S. Appl. No. 12/833,016 dated May 10, 2013.

Office Action Summary in U.S. Appl. No. 12/833,016 dated Sep. 20, 2012.

Office Action Summary in U.S. Appl. No. 13/624,906 dated Dec. 31, 2014.

Office Action Summary in U.S. Appl. No. 13/624,940 dated Jul. 18, 2014.

Office Action Summary in U.S. Appl. No. 13/626,635 dated Aug. 29, 2014.

Office Action Summary in U.S. Appl. No. 13/647,144 dated Dec. 1, 2014.

Office Action Summary in U.S. Appl. No. 13/654,647 dated Sep. 25, 2014.

Office Action Summary in U.S. Appl. No. 13/716,156 dated Mar. 26, 2015.

Office Action Summary in U.S. Appl. No. 13/716,158 dated May 8, 2015.

Office Action Summary in U.S. Appl. No. 13/716,159 dated Oct. 7, 2015.

Office Action Summary in U.S. Appl. No. 13/716,160 dated Oct. 26, 2015.

Office Action Summary in U.S. Appl. No. 14/274,623 dated Mar. 29, 2017.

Office Action Summary in U.S. Appl. No. 14/274,623 dated Oct. 3, 2016.

Press Release, "Amazon.com Launches "Amazon TextBuyIt," Making It Fast and Easy for Customers to Shop and Buy on Amazon.com Using Text Messages", Amazon, Apr. 2, 2008, available at http://phx.corporate-ir.net/phoenix.zhtml?c=176060&p=irol-newsArticie&ID=1124741.

Press Release, "Premier wireless operator in the US selects eGain virtual assistant technology to provide innovative, multilingual customer self-service" eGain, Oct. 6, 2011, available at http://www.egain.com/company/news/press_releases_2011/premier-wireless-operator-in-the-us-selects-egain-virtual-assistant-technology-to-provide-innovative-multilingual-customer-self-service/.

Resnick, E, "Internet Message Format", RFC 5322, pp. 1-57, Oct. 2008, Internet Engineering Task Force (IEFT), http://www.ietf.org/rfc/rfc5322.txt.

Richardson T, et al, "The Remote Framebuffer Protocol", RFC 6143, pp. 1-39, Mar. 2011, Internet Engineering Task Force (IEFT), http://www.ietf.org/rfc/rfc6143.txt.

Rosenberg, J, et al, "SIP: Session Initiation Protocol", RFC 3261, pp. 1-269, Jun. 2002, Internet Engineering Task Force (IEFT), http://www.ietf.org/rfc/rfc3261.txt.

Rothman, Wilson "Amazon "Simple" TextBuyIt Text-Message Shopping Sounds Complicated", Gizmodo, Apr. 2, 2008, available at https://gizmodo.com/375115/amazon-simple-textbuyit-text-message-shopping-sounds-complicated Simonite, Tom, "Shopping via Text Message," MIT Technology Review, Business Report, Nov. 23, 2010, available at https://www.technologyreview.com/s/421784/shopping-via-text-message/.

Website Page, "Sending video via text message", Android Central, Jan. 26, 2014, available at https://forums.androidcentral.com/motorola-droid-x/46718-sending-video-via-text-message.html.

Wilde, E, et al, "URI Scheme for Global System for Mobile Communications (GSM) Short Message Service", RFC 5724, pp. 1-18, Jan. 2010, Internet Engineering Task Force (IEFT), http://www.ietf.org/rfc/rfc5724.txt.

\* cited by examiner

800a

MIME-Version: 1.0
Content-Type: multipart/mixed; boundary="--OoOT----toOo--------"
　　　　　　　　　　　　　　　　814a
--OoOT----toOo--------
Content-Type: text/plain
Too whom it may concern, I'm writing to inform you that .... 　812a Sincerely,
Some Body
--OoOT----toOo--------　　　　　　　　　　　804a
Content-Type: application/keyword-query
Accept: image/*　　　　　　　806a
810a —<keyword-query>
　　　\<and>
808a 　<criterion type="query" language="keyword" expression="'FORM 1040SE'" />
　　　　<criterion type="scope" resource-type="application/pdf" />
　　　</and>
　</keyword-queryt>
--OoOT----toOo--------

MIME-Version: 1.0
Content-Type: multipart/mixed; boundary="--toOo----OoOt--------"

--toOo----OoOt--------
Content-Type: text/plain
Dad,

See attached. 　802b

Love,
William
--toOo----OoOt--------
Content-Type: application/query-respponse　　806b FILE://Documents/Family/FamilyHistory.docx
FILE://Documents/Letters/XmasLetter-2012.pdf　　804b
--toOo----OoOt--------

FIG. 8B

METHODS AND COMPUTER PROGRAM PRODUCTS FOR PROCESSING A SEARCH

RELATED APPLICATIONS

The present application is a continuation-in-part of and claims priority to U.S. application Ser. No. 15/800,033 filed Oct. 31, 2017 and entitled "METHODS, SYSTEMS, AND COMPUTER PROGRAM PRODUCTS FOR PROCESSING A DATA OBJECT IDENTIFICATION REQUEST IN A COMMUNICATION" which in turn is a continuation-in-part of and claims priority to U.S. application Ser. No. 14/274,623 (published as US 2014-0365588 A1) filed May 9, 2014 and entitled "METHODS, SYSTEMS, AND COMPUTER PROGRAM PRODUCTS FOR PROCESSING A DATA OBJECT IDENTIFICATION REQUEST IN A COMMUNICATION" which in turn is a continuation-in-part of and claims priority to: U.S. application Ser. No. 13/654,647 (published as US 2014-0112319 A1) filed Oct. 18, 2012 and entitled "METHODS, SYSTEMS, AND COMPUTER PROGRAM PRODUCTS FOR CONSTRAINING A DATA EXCHANGE REQUESTED IN A COMMUNICATION," U.S. application Ser. No. 13/716,156 (published as US 2014-0172912 A1) filed Dec. 16, 2012 and entitled "METHODS, SYSTEMS, AND COMPUTER PROGRAM PRODUCTS FOR PROCESSING A SEARCH QUERY EXCHANGED VIA A COMMUNICATIONS PROTOCOL," and U.S. application Ser. No. 13/716,159 (published as US 2014-0172998 A1) filed Dec. 16, 2012 and entitled "METHODS, SYSTEMS, AND COMPUTER PROGRAM PRODUCTS FOR BROWSING VIA A COMMUNICATIONS AGENT," where U.S. application Ser. No. 13/716, 159 incorporates the following applications by reference:

Application Ser. No. 13/716,156 (published as US 2014-0172912 A1) filed on 2012 Dec. 16, entitled "METHODS, SYSTEMS, AND PROGRAM PRODUCTS FOR PROCESSING A SEARCH QUERY VIA A COMMUNICATIONS PROTOCOL";

Application Ser. No. 13/716,160 (published as US 2014-0172999 A1) filed on 2012 Dec. 16, entitled "METHODS, SYSTEMS, AND PROGRAM PRODUCTS FOR ACCESSING A SERVICE VIA A PROXY COMMUNICATIONS AGENT";

Application Ser. No. 13/716,158 (published as US 2014-0173449 A1) filed on 2012 Dec. 16, entitled "METHODS, SYSTEMS, AND PROGRAM PRODUCTS FOR PROCESSING A REQUEST VIA A COMMUNICATIONS AGENT";

Application Ser. No. 13/624,906 (published as US 2014-0089419 A1) filed on 2012 Sep. 22, entitled "METHODS, SYSTEMS, AND PROGRAM PRODUCTS FOR PROCESSING A DATA OBJECT REQUEST IN A COMMUNICATION";

Application Ser. No. 13/626,635 (published as US 2014-0089421 A1) filed on 2012 Sep. 25, entitled "METHODS, SYSTEMS, AND PROGRAM PRODUCTS FOR SHARING A DATA OBJECT IN A DATA STORE VIA A COMMUNICATION";

Application Ser. No. 13/647,144 (published as US 2014-0101554 A1) filed on 2012 Oct. 8, entitled "METHODS, SYSTEMS, AND PROGRAM PRODUCTS FOR EXCHANGING PRESENTATION DATA IN A COMMUNICATION";

Application Ser. No. 13/624,940 (published as US 2014-0089420 A1) filed on 2012 Sep. 23, entitled "METHODS, SYSTEMS, AND PROGRAM PRODUCTS FOR PROCESSING A REFERENCE IN A COMMUNICATION TO A REMOTE DATA OBJECT"; and Application Ser. No. 13/654,647 (published as US 2014-0112319 A1) filed on 2012 Oct. 18, entitled "METHODS, SYSTEMS, AND PROGRAM PRODUCTS FOR CONSTRAINING A DATA EXCHANGE REQUEST IN A COMMUNICATION", and where U.S. application Ser. No. 13/654,647 incorporates the following applications by reference:

Application Ser. No. 12/833,014 (published as US 2012-0011207 A1) filed on 2010 Jul. 9, entitled "METHODS, SYSTEMS, AND PROGRAM PRODUCTS FOR PROCESSING A REQUEST FOR A RESOURCE IN A COMMUNICATION;" and Application Ser. No. 12/833,016 (published as US 2012-0011444 A1) filed on 2010 Jul. 9, entitled "METHODS, SYSTEMS, AND PROGRAM PRODUCTS FOR REFERENCING AN ATTACHMENT IN A COMMUNICATION".

The following applications are incorporated herein by reference:

U.S. application Ser. No. 13/716,159 (published as US 2014-0172998 A1) filed Dec. 16, 2012 and entitled "METHODS, SYSTEMS, AND COMPUTER PROGRAM PRODUCTS FOR BROWSING VIA A COMMUNICATIONS AGENT;"

Application Ser. No. 13/716,156 (published as US 2014-0172912 A1) filed on 2012 Dec. 16, entitled "METHODS, SYSTEMS, AND PROGRAM PRODUCTS FOR PROCESSING A SEARCH QUERY VIA A COMMUNICATIONS PROTOCOL";

Application Ser. No. 13/716,160 (published as US 2014-0172999 A1) filed on 2012 Dec. 16, entitled "METHODS, SYSTEMS, AND PROGRAM PRODUCTS FOR ACCESSING A SERVICE VIA A PROXY COMMUNICATIONS AGENT";

Application Ser. No. 13/716,158 (published as US 2014-0173449 A1) filed on 2012 Dec. 16, entitled "METHODS, SYSTEMS, AND PROGRAM PRODUCTS FOR PROCESSING A REQUEST VIA A COMMUNICATIONS AGENT";

Application Ser. No. 13/624,906 (published as US 2014-0089419 A1) filed on 2012 Sep. 22, entitled "METHODS, SYSTEMS, AND PROGRAM PRODUCTS FOR PROCESSING A DATA OBJECT REQUEST IN A COMMUNICATION";

Application Ser. No. 13/626,635 (published as US 2014-0089421 A1) filed on 2012 Sep. 25, entitled "METHODS, SYSTEMS, AND PROGRAM PRODUCTS FOR SHARING A DATA OBJECT IN A DATA STORE VIA A COMMUNICATION";

Application Ser. No. 13/647,144 (published as US 2014-0101554 A1) filed on 2012 Oct. 8, entitled "METHODS, SYSTEMS, AND PROGRAM PRODUCTS FOR EXCHANGING PRESENTATION DATA IN A COMMUNICATION";

Application Ser. No. 13/624,940 (published as US 2014-0089420 A1) filed on 2012 Sep. 23, entitled "METHODS, SYSTEMS, AND PROGRAM PRODUCTS FOR PROCESSING A REFERENCE IN A COMMUNICATION TO A REMOTE DATA OBJECT";

Application Ser. No. 13/654,647 (published as US 2014-0112319 A1) filed on 2012 Oct. 18, entitled "METHODS, SYSTEMS, AND PROGRAM PRODUCTS FOR CONSTRAINING A DATA EXCHANGE REQUEST IN A COMMUNICATION";

Application Ser. No. 12/833,014 (published as US 2012-0011207 A1) filed on 2010 Jul. 9, entitled "METHODS, SYSTEMS, AND PROGRAM PRODUCTS FOR PROCESSING A REQUEST FOR A RESOURCE IN A COMMUNICATION;" and Application Ser. No. 12/833,016 (published as US 2012-0011444 A1) filed on 2010 Jul. 9, entitled "METHODS, SYSTEMS, AND PROGRAM PRODUCTS FOR REFERENCING AN ATTACHMENT IN A COMMUNICATION".

BACKGROUND

Many users spend much of their time with computing devices in interacting with communications applications or communications agents; such a voice agents, email agents, instant messaging agents, and multi-media communications agents that allow communication via video, still images, audio, and/or text. To access documents and/or web content, users must leave their communications agents to access other applications which are not well integrated with communications agents. Further, access to network resources including data and services may vary depending on whether a user is connected to a work intranet, a home network, a wireless network of a wireless voice and Internet service provider. Due to the importance of user communication, communications agents have access to data and services from most locations, via most service providers, and/or via organizations that own and/or control a network through which a user device connects. Integration of network capabilities such as Internet search and intranet search into a communications agent would allow user's access to data and services not accessible via current web search, allow users' to remain engaged with their communications agents, and provide new capabilities as described herein.

Accordingly, there exists a need for methods, systems, and computer program products for processing a search query exchanged via a communications protocol.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

In one embodiment, a computer-implemented method is provided, comprising: creating at least a portion of an instant messaging application that is configured to cooperate with a relay that is configured to communicate with a web service, the instant messaging application, when executed, configured to cause a device to: display an instant messaging interface including a textbox user interface element for receiving a message text portion and a send user interface element for sending the message text portion in response to a user selection thereof, receive, from the relay and utilizing a communications agent on the device configured to receive incoming messages addressed to a communicant identifier associated with a user of the instant messaging application, a first message, in response to the receipt, from the relay and utilizing the communications agent on the device configured to receive the incoming messages addressed to the communicant identifier associated with the user of the instant messaging application, of the first message: display, via the instant messaging interface, at least a portion of the first message; after the display, via the instant messaging interface, of the least portion of the first message: receive, via the textbox user interface element of the instant messaging interface, one or more textual words that are received as a reply to the first message, after the receipt, via the textbox user interface element of the instant messaging interface, of the one or more textual words: receive, via the instant messaging interface, an indication of a selection on the send user interface element of the instant messaging interface, in response to the receipt, via the instant messaging interface, of the indication of the selection on the send user interface element of the instant messaging interface: send, to the relay and utilizing the communications agent on the device configured to send outgoing messages addressed from the communicant identifier associated with the user of the instant messaging application, a second message including the one or more textual words and an automatically determined contactee identifier, for causing the relay to: send, from the relay to the web service, a third message including the one or more textual words, for causing the web service to: send, to the relay, a fourth message with at least one image that is identified based on the one or more textual words, for causing the relay to: send, to the device, a fifth message including the at least one image, receive, from the relay and utilizing the communications agent on the device configured to receive the incoming messages addressed to the communicant identifier associated with the user of the instant messaging application, the fifth message including the at least one image, and in response to the receipt, from the relay and utilizing the communications agent on the device configured to receive the incoming messages addressed to the communicant identifier associated with the user of the instant messaging application, of the fifth message including the at least one image: display, via the instant messaging interface, the at least one image; and causing storage of the at least portion of the instant messaging application.

In another embodiment, a computer-implemented method is provided, comprising: creating at least a portion of an instant messaging application that is configured to cooperate with an apparatus, the instant messaging application, when executed, configured to cause a device to: display an instant messaging interface including a textbox user interface element for receiving an editable one or more textual words, a send user interface element for sending the one or more textual words in response to a user selection thereof, and an uneditable user interface element, receive, via the textbox user interface element of the instant messaging interface, an editable set of one or more textual words, after the receipt, via the textbox user interface element of the instant messaging interface, the editable set of one or more textual words: receive, via the instant messaging interface, an indication of a selection on the send user interface element of the instant messaging interface, in response to the receipt, via the instant messaging interface, of the indication of the selection on the send user interface element of the instant messaging interface: generate a first request message that includes the editable set of one or more textual words, in response to the generation of the first request message that includes the editable set of one or more textual words: send, to the apparatus and with a communicant identifier associated with a user of the instant messaging application, the first request message that includes the editable set of one or more textual words, after sending, to the apparatus and with the communicant identifier associated with the user of the instant messaging application, the first request message that includes the editable set of one or more textual words: receive, from the apparatus and with the communicant identifier associated with the user of the instant messaging application, a first response including at least one first image that is automatically located based on the editable set of one or more textual words of the first request message; in response to the receipt, from the apparatus and with the communicant identifier associated with the user of the instant messaging application, of the first response including the at least one first image that is automatically located based on the editable set of one or more textual words of the first request message: display, via the instant messaging interface, the at least one first image, receive, via the instant messaging interface, an indication of a selection on the uneditable user interface element of the instant messaging interface, in response to the receipt, via the instant messaging interface, of the indication of the selection on the uneditable user interface element of the instant messaging interface: generate a second request message, in response to the generation of the second request message: send, to the apparatus and with the communicant identifier associated with a user of the instant messaging application, the second request message, after sending, to the apparatus and with the communicant identifier associated with the user of the instant messaging application, the second request message: receive, from the apparatus and with the communicant identifier associated with the user of the instant messaging application, a second response including at least one second image that is automatically located based on the second request message, and in response to the receipt, from the apparatus and with the communicant identifier associated with the user of the instant messaging application, of the second response including the at least one second image that is automatically located based on the second request message: display, via the instant messaging interface, the at least one second image; and causing storage of the at least portion of the instant messaging application.

In other embodiments, other methods and/or non-transitory media are provided which may omit one or more of the features disclosed in the above embodiments.

In still other embodiments, methods and systems are described for processing a search query exchanged via a communications protocol. In one aspect, the method includes receiving, from a first user by a first communications agent operating in a first execution environment, search information. The method further includes sending, via a network to a communications service by the first communications agent in a communication including a communicant identifier, a communications request identifying a search query based on the search information. The method still further includes receiving, by the first execution environment in response to the sending of the communications request, a communications response that identifies a communications search result determined based on the communicant identifier. Performing at least one the preceding actions comprising the method includes execution of an instruction by a processor.

Also, a system for processing a search query exchanged via a communications protocol is described that includes at least one processor; and logic encoded in at least one data storage media to execute by the at least one processor that when executed is operable for receiving, from a first user by a first communications agent operating in a first execution environment, search information; sending, via a network to a communications service by the first communications agent in a communication including a communicant identifier, a communications request identifying a search query based on the search information; and receiving, by the first execution environment in response to the sending of the communications request, a communications response that identifies a communications search result determined based on the communicant identifier.

Further, a system for processing a search query exchanged via a communications protocol is described. The system includes a processor that executes an instruction included in at least one of a request agent component, a com-out component, and a response director component during operation of the system. During operation of the system the request agent component is operable for and/or otherwise is included in receiving, from a first user by a first communications agent operating in a first execution environment, search information; the com-out component is operable for and/or otherwise is included in sending, via a network to a communications service by the first communications agent in a communication including a communicant identifier, a communications request identifying a search query based on the search information; and the response director component is operable for and/or otherwise is included in receiving, by the first execution environment in response to the sending of the communications request, a communications response that identifies a communications search result determined based on the communicant identifier.

In another aspect, a method includes receiving, in a communication that includes a first communicant identifier via a network from a communications agent representing a first communicant and operating in a first execution environment, a communications request that identifies a search query. The method further includes sending a query request, based on the search query, to a search service. The method still further includes receiving a query response from the search service. The method additionally includes sending, via the network to the first execution environment, a communications response that identifies, based on the first communicant identifier and the query response, a communications search result. Performing at least one the preceding actions comprising the method includes execution of an instruction by a processor.

Also, a system for processing a search query exchanged via a communications protocol is described that includes at least one processor; and logic encoded in at least one data storage media to execute by the at least one processor that when executed is operable for receiving, in a communication that includes a first communicant identifier via a network from a communications agent representing a first communicant and operating in a first execution environment, a communications request that identifies a search query; sending a query request, based on the search query, to a search service; receiving a query response from the search service; and sending, via the network to the first execution environment, a communications response that identifies, based on the first communicant identifier and the query response, a communications search result.

Further, a system for processing a search query exchanged via a communications protocol is described. The system includes a processor that executes an instruction included in at least one of a request-in component, a request gateway component, a response-in component, and a response gateway component during operation of the system. During operation of the system the request-in component is operable for and/or otherwise is included in receiving, in a communication that includes a first communicant identifier via a network from a communications agent representing a first communicant and operating in a first execution environment, a communications request that identifies a search query; the request gateway component is operable for and/or otherwise is included in sending a query request, based on the search query, to a search service; the response-in component is operable for and/or otherwise is included in receiving a query response from the search service; and the response gateway component is operable for and/or otherwise is included in sending, via the network to the first execution environment, a communications response that identifies, based on the first communicant identifier and the query response, a communications search result.

BRIEF DESCRIPTION OF THE DRAWINGS

Objects and advantages of the present invention will become apparent to those skilled in the art upon reading this description in conjunction with the accompanying drawings, in which like reference numerals have been used to designate like or analogous elements, and in which:

FIG. 8A illustrates an exemplary portion of a communication according to an aspect of the subject matter described herein; and FIG. 8B illustrates another exemplary portion of a communication according to an aspect of the subject matter described herein.

DETAILED DESCRIPTION

Figure 1:
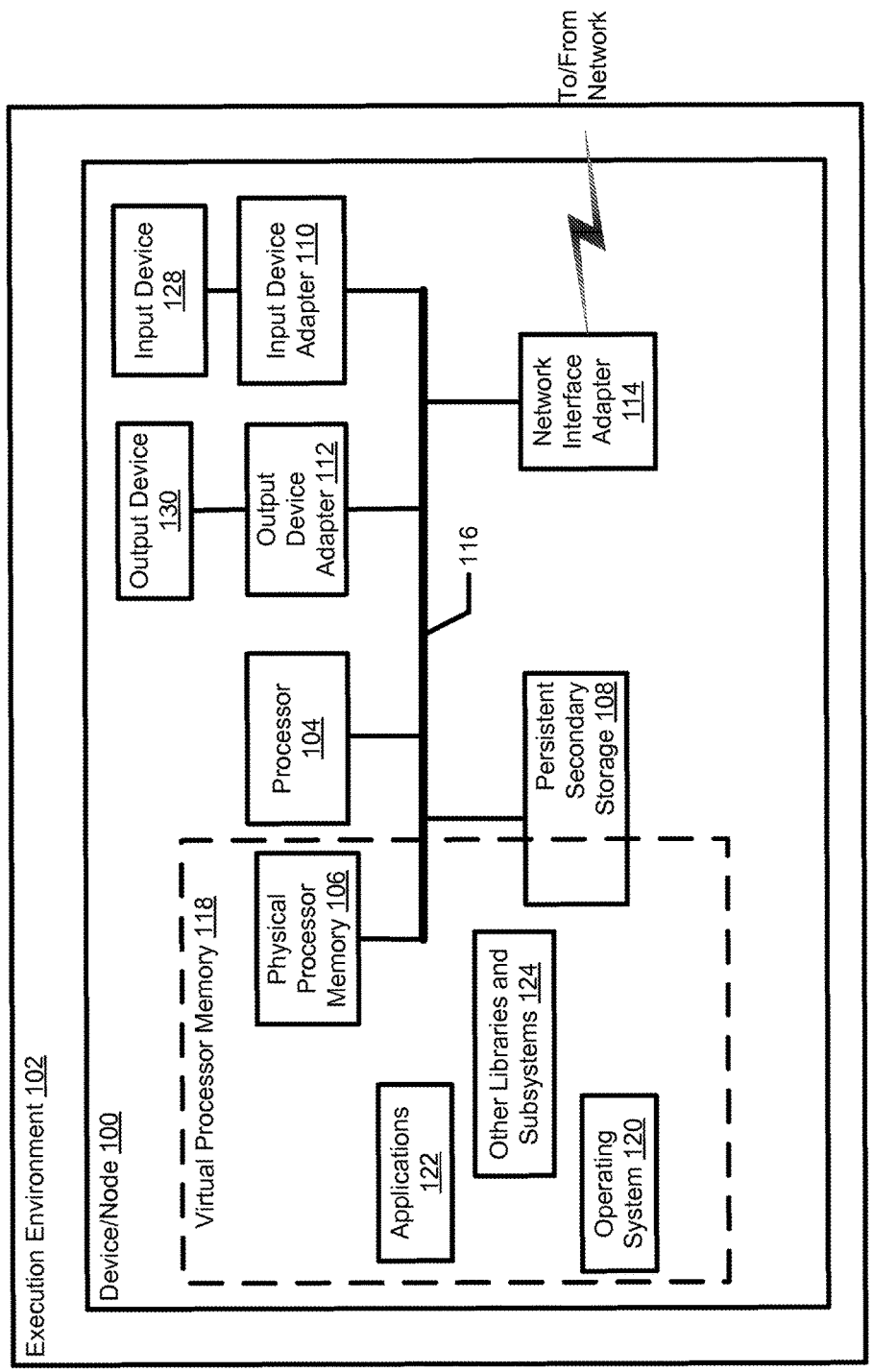
FIG. 1 is a block diagram illustrating an exemplary execution environment in which the subject matter may be implemented that includes and/or otherwise is provided by a hardware device.

One or more aspects of the disclosure are described with reference to the drawings, wherein like reference numerals are generally utilized to refer to like elements throughout, and wherein the various structures are not necessarily drawn to scale. In the following description, for purposes of explanation, numerous specific details are set forth in order to provide a thorough understanding of one or more aspects of the disclosure. It may be evident, however, to one skilled in the art, that one or more aspects of the disclosure may be practiced with a lesser degree of these specific details. In other instances, well-known structures and devices are shown in block diagram form in order to facilitate describing one or more aspects of the disclosure. It is to be understood that other embodiments and/or aspects may be utilized and structural and functional modifications may be made without departing from the scope of the subject matter disclosed herein.

The use of "including", "comprising", "having", and variations thereof are meant to encompass the items listed thereafter and equivalents thereof as well as additional items and equivalents thereof. Terms used to describe interoperation and/or coupling between components are intended to include both direct and indirect interoperation and/or coupling, unless otherwise indicated. Exemplary terms used in describing interoperation and/or coupling include "mounted," "connected," "attached," "coupled," "communicatively coupled," "operatively coupled," "invoked", "called", "provided", "received", "identified", "interoperated" and similar terms and their variants.

As used herein, any reference to an entity "in" an association is equivalent to describing the object as "identified" by the association, unless explicitly indicated otherwise.

Unless otherwise defined, all technical and scientific terms used herein have the same meaning as commonly understood by one of ordinary skill in the art to which this disclosure belongs. Although methods, components, and devices similar or equivalent to those described herein can be used in the practice or testing of the subject matter described herein, suitable methods, components, and devices are described below.

All publications, patent applications, patents, and other references mentioned herein are incorporated by reference in their entirety. In case of conflict, the present disclosure, including definitions, will control. In addition, the materials, methods, and examples are illustrative only and not intended to be limiting.

An exemplary device included in an execution environment that may be programmed, adapted, modified, and/or otherwise configured according to the subject matter is illustrated in FIG. 1. An "execution environment", as used herein, is an arrangement of hardware and, in some aspects, software that may be further modified, transformed, and/or otherwise configured to include and/or otherwise host an arrangement of components to perform a method of the subject matter described herein. An execution environment includes and/or is otherwise provided by one or more devices. The execution environment is said to be the execution environment "of" the device and/or devices. An execution environment may be and/or may include a virtual execution environment including software components operating in a host execution environment. Exemplary devices included in and/or otherwise providing suitable execution environments that may be adapted, programmed, and/or otherwise modified according to the subject matter include a workstation, a desktop computer, a laptop or notebook computer, a server, a handheld computer, a mobile telephone or other portable telecommunication device, a media playing device, a gaming system, a tablet computer, a portable electronic device, a handheld electronic device, a multiprocessor device, a distributed system, a consumer electronic device, a router, a network server, or any other type and/or form of computing, telecommunications or media device that is suitable to perform the subject matter described herein. Those skilled in the art will understand that the components illustrated in FIG. 1 are exemplary and may vary by particular execution environment.

FIG. 1 illustrates a hardware device 100 included in an execution environment 102. FIG. 1 illustrates that execution environment 102 includes a processor 104, such as one or more microprocessors; a physical processor memory 106 including storage locations identified by addresses in a physical memory address space of processor 104; a persistent secondary storage 108, such as one or more hard drives and/or flash storage media; an input device adapter 110, such as a key or keypad hardware, a keyboard adapter, and/or a mouse adapter; an output device adapter 112, such as a display and/or an audio adapter to present information to a user; a network interface component, illustrated by a network interface adapter 114, to communicate via a network such as a LAN and/or WAN; and a mechanism that operatively couples elements 104-114, illustrated as a bus 116. Elements 104-114 may be operatively coupled by various means. Bus 116 may comprise any type of bus architecture, including a memory bus, a peripheral bus, a local bus, and/or a switching fabric.

As used herein a "processor" is an instruction execution machine, apparatus, or device. A processor may include one or more electrical, optical, and/or mechanical components that operate in interpreting and executing program instructions. Exemplary processors include one or more microprocessors, digital signal processors (DSPs), graphics processing units, application-specific integrated circuits (ASICs), optical or photonic processors, and/or field programmable gate arrays (FPGAs). Processor 104 may access instructions and data via one or more memory address spaces in addition to the physical memory address space. A memory address space includes addresses identifying locations in a processor memory. The addresses in a memory address space are included in defining a processor memory. Processor 104 may have more than one processor memory. Thus, processor 104 may have more than one memory address space. Processor 104 may access a location in a processor memory by processing an address identifying the location. The processed address may be identified by an operand of an instruction and/or may be identified by a register and/or other portion of processor 104.

FIG. 1 illustrates a virtual processor memory 118 spanning at least part of physical processor memory 106 and may span at least part of persistent secondary storage 108. Virtual memory addresses in a memory address space may be mapped to physical memory addresses identifying locations in physical processor memory 106. An address space including addresses that identify locations in a virtual processor memory is referred to as a "virtual memory address space"; its addresses are referred to as "virtual memory addresses"; and its processor memory is referred to as a "virtual processor memory" or "virtual memory". The term "processor memory" may refer to physical processor memory, such as processor memory 106, and/or may refer to virtual processor memory, such as virtual processor memory 118, depending on the context in which the term is used.

Physical processor memory 106 may include various types of memory technologies. Exemplary memory technologies include static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC 100 SDRAM, Double Data Rate SDRAM (DDR SDRAM), Enhanced SDRAM (ESDRAM), SyncLink DRAM (SLDRAM), Ferroelectric RAM (FRAM), RAMBUS DRAM (RDRAM) Direct DRAM (DRDRAM), and/or XDR™ DRAM. Physical processor memory 106 may include volatile memory as illustrated in the previous sentence and/or may include non-volatile memory such as non-volatile flash RAM (NVRAM) and/or ROM.

Persistent secondary storage 108 may include one or more flash memory storage devices, one or more hard disk drives, one or more magnetic disk drives, and/or one or more optical disk drives. Persistent secondary storage may include a removable data storage medium. The drives and their associated computer readable media provide volatile and/or nonvolatile storage for computer-executable instructions, data structures, program components, and other data.

Execution environment 102 may include software components stored in persistent secondary storage 108, in remote storage accessible via a network, and/or in a processor memory. FIG. 1 illustrates execution environment 102 including an operating system 120, one or more applications 122, and other program code and/or data components illustrated by other libraries and subsystems 124. In an aspect, some or all software components may be stored in locations accessible to processor 104 in a shared memory address space shared by the software components. The software components accessed via the shared memory address space may be stored in a shared processor memory defined by the shared memory address space. In another aspect, a first software component may be stored in one or more locations accessed by processor 104 in a first address space and a second software component may be stored in one or more locations accessed by processor 104 in a second address space. The first software component is stored in a first processor memory defined by the first address space and the second software component is stored in a second processor memory defined by the second address space.

Software components typically include instructions executed by processor 104 in a computing context referred to as a "process". A process may include one or more "threads". A "thread" includes a sequence of instructions executed by processor 104 in a computing sub-context of a process. The terms "thread" and "process" may be used interchangeably herein when a process includes only one thread.

Execution environment 102 may receive user-provided information via one or more input devices illustrated by an input device 128. Input device 128 provides input information to other components in execution environment 102 via input device adapter 110. Execution environment 102 may include an input device adapter for a keyboard, a touch screen, a microphone, a joystick, a television receiver, a video camera, a still camera, a document scanner, a fax, a phone, a modem, a network interface adapter, and/or a pointing device, to name a few exemplary input devices.

Input device 128 included in execution environment 102 may be included in device 100 as FIG. 1 illustrates or may be external (not shown) to device 100. Execution environment 102 may include one or more internal and/or external input devices. External input devices may be connected to device 100 via corresponding network interfaces such as a serial port, a parallel port, and/or a universal serial bus (USB) port. Input device adapter 110 may receive input and provide a representation to bus 116 to be received by processor 104, physical processor memory 106, and/or other components included in execution environment 102.

An output device 130 in FIG. 1 exemplifies one or more output devices that may be included in and/or that may be external to and operatively coupled to device 100. For example, output device 130 is illustrated connected to bus 116 via output device adapter 112. Output device 130 may be a display device. Exemplary display devices include liquid crystal displays (LCDs), light emitting diode (LED) displays, and projectors. Output device 130 presents output of execution environment 102 to one or more users. In some embodiments, an input device may also include an output device. Examples include a phone, a joystick, and/or a touch screen. In addition to various types of display devices, exemplary output devices include printers, speakers, tactile output devices such as motion-producing devices, and other output devices producing sensory information detectable by a user. Sensory information detected by a user is referred herein to as "sensory input" with respect to the user.

A device included in and/or otherwise providing an execution environment may operate in a networked environment communicating with one or more devices via one or more network interface components. FIG. 1 illustrates network interface adapter (NIA) 114 as a network interface component included in execution environment 102 to operatively couple device 100 to a network. A network interface component includes a network interface hardware (NIH) component and optionally a network interface software (NIS) component.

Exemplary network interface components include network interface controllers, network interface cards, network interface adapters, and line cards. A node may include one or more network interface components to interoperate with a wired network and/or a wireless network. Exemplary wireless networks include a BLUETOOTH network, a wireless 802.11 network, and/or a wireless telephony network (e.g., AMPS, TDMA, CDMA, GSM, GPRS UMTS, and/or PCS network). Exemplary network interface components for wired networks include Ethernet adapters, Token-ring adapters, FDDI adapters, asynchronous transfer mode (ATM) adapters, and modems of various types. Exemplary wired and/or wireless networks include various types of LANs, WANs, and/or personal area networks (PANs). Exemplary networks also include intranets and internets such as the Internet.

The terms "network node" and "node" in this document both refer to a device having a network interface component to operatively couple the device to a network. Further, the terms "device" and "node" used herein refer to one or more devices and nodes, respectively, providing and/or otherwise included in an execution environment unless clearly indicated otherwise.

The user-detectable outputs of a user interface are generically referred to herein as "user interface elements" or abbreviated as "UI elements". More specifically, visual outputs of a user interface are referred to herein as "visual interface elements". A visual interface element may be a visual output of a graphical user interface (GUI). Exemplary visual interface elements include icons, image data, graphical drawings, font characters, windows, textboxes, sliders, list boxes, drop-down lists, spinners, various types of menus, toolbars, ribbons, combo boxes, tree views, grid views, navigation tabs, scrollbars, labels, tooltips, text in various fonts, balloons, dialog boxes, and various types of button controls including check boxes, and radio buttons. An application interface may include one or more of the elements listed. Those skilled in the art will understand that this list is not exhaustive. The terms "visual representation", "visual output", and "visual interface element" are used interchangeably in this document. Other types of UI elements include audio outputs referred to as "audio interface elements", tactile outputs referred to as "tactile interface elements", and the like.

A "user interface (UI) element handler" component, as the term is used herein, refers to a component that operates to send information representing a program entity to present a user-detectable representation of the program entity by an output device, such as a display. A "program entity" is an object included in and/or otherwise processed by an application or executable. The user-detectable representation is presented based on the sent information. Information that represents a program entity to present a user detectable representation of the program entity by an output device is referred to herein as "presentation information". Presentation information may include and/or may otherwise identify data in one or more formats. Exemplary formats include image formats such as raw pixel data, JPEG, video formats such as MP4, markup language data such as hypertext markup language (HTML) and other XML-based markup, a bit map, and/or instructions such as those defined by various script languages, byte code, and/or machine code. For example, a web page received by a browser or more generally a user agent from a remote application provider may include HTML, ECMAScript, and/or byte code to present one or more UI elements included in a user interface of the remote application. Components that send information representing one or more program entities to present particular types of output by particular types of output devices include visual interface element handler components, audio interface element handler components, tactile interface element handler components, and the like.

A representation of a program entity may be stored and/or otherwise maintained in a presentation space. As used in this document, the term "presentation space" refers to a storage region allocated and/or otherwise provided to store and/or otherwise represent presentation information, which may include audio, visual, tactile, and/or other sensory data for presentation by and/or on an output device. For example, a memory buffer to store an image and/or text string may be a presentation space as sensory information for a user. A presentation space may be physically and/or logically contiguous or non-contiguous. A presentation space may have a virtual as well as a physical representation. A presentation space may include a storage location in a processor memory, secondary storage, a memory of an output adapter device, and/or a storage medium of an output device. A screen of a display, for example, is a presentation space.

An "interaction", as the term is used herein, refers to any activity including a user and an object where the object is a source of sensory data detected by the user and/or the user is a source of input for the object. An interaction, as indicated, may include the object as a target of input from the user. The input from the user may be provided intentionally or unintentionally by the user. For example, a rock being held in the hand of a user is a target of input, both tactile and energy input, from the user. A portable electronic device is a type of object. In another example, a user looking at a portable electronic device is receiving sensory data from the portable electronic device whether the device is presenting an output via an output device or not. The user manipulating an input component of the portable electronic device exemplifies the device, as an input target, receiving input from the user. Note that the user in providing input is receiving sensory information from the portable electronic. An interaction may include an input from the user that is detected and/or otherwise sensed by the device. An interaction may include sensory information that is received by a user included in the interaction that is presented by an output device included in the interaction.

As used herein "interaction information" refers to any information that identifies an interaction and/or otherwise provides data about an interaction between a user and an object, such as a portable electronic device. Exemplary interaction information may identify a user input for the object, a user-detectable output presented by an output device of the object, a user-detectable attribute of the object, an operation performed by the object in response to a user, an operation performed by the object to present and/or otherwise produce a user-detectable output, and/or a measure of interaction.

Interaction information for one object may include and/or otherwise identify interaction information for another object. For example, a motion detector may detect a user's head turn in the direction of a display of a portable electronic device. Interaction information indicating that the user's head is facing the display may be received and/or used as interaction information for the portable electronic device indicating the user is receiving visual input from the display. The interaction information may serve to indicate a lack of user interaction with one or more other objects in directions from the user different than the detected direction, such as a person approaching the user from behind the user. Thus the interaction information may serve as interaction information for one or more different objects.

As used herein, the terms "program" and "executable" refer to any data representation that may be translated into a set of machine code instructions and may optionally include associated program data. The terms are used interchangeably herein. Program representations other than machine code include object code, byte code, and source code. Object code includes a set of instructions and/or data elements that either are prepared to link prior to loading or are loaded into an execution environment. When in an execution environment, object code may include references resolved by a linker and/or may include one or more unresolved references. The context in which this term is used will make clear the state of the object code when it is relevant. This definition can include machine code and virtual machine code, such as Java™ byte code. A program and/or executable may include one or more components, referred to herein as a "program component", "software component", and/or "executable component". As used herein, the terms "application", and "service" may be realized in one or more program components and/or in one or more hardware components.

As used herein, the term "network protocol" refers to a set of rules, conventions and/or schemas that govern how nodes exchange information over a network. The set may define, for example, a convention and/or a data structure. The term "network path" as used herein refers to a sequence of nodes in a network that are communicatively coupled to transmit data in one or more data units of a network protocol between a pair of nodes in the network.

A "data unit", as the term is used herein, is an entity specified according to a network protocol to transmit data between a pair of nodes in a network path to send the data from a source node to a destination node that includes an identified protocol endpoint of the network protocol. A network protocol explicitly and/or implicitly specifies and/or otherwise identifies a schema that defines one or more of a rule for a format for a valid data unit and a vocabulary for content of a valid data unit. One example of a data unit is an Internet Protocol (IP) packet. The Internet Protocol defines rules for formatting an IP packet that defines a header to identify a destination address that identifies a destination node and a payload portion to include a representation of data to be delivered to the identified destination node. Various address types are specified defining a vocabulary for one or more address portions of an IP data unit. The terms "data unit", "frame", "data packet", and "packet" are used interchangeably herein. One or more data units of a first network protocol may transmit a "message" of second network protocol. For example, one or more data units of the IP protocol may include a TCP message. In another example, one or more TCP data units may transmit an HTTP message.

How data is packaged in one more data units for a network protocol may vary as the data traverses a network path from a source node to a destination node. Data may be transmitted in a single data unit between two consecutive nodes in a network path. Additionally, data may be exchanged between a pair of consecutive nodes in several data units each including a portion of the data. Data received in a single data unit by a node in a network path may be split into portions included in several respective data units to transmit to a next node in the network path. Portions of data received in several data units may be combined into a single data unit to transmit by a node in a network path. For purposes of describing the subject matter, a data unit in which data is received by a node is referred to as a different data unit than a data unit in which the data is forwarded by the node.

A "protocol address", as the term is used herein, for a network protocol is an identifier of a protocol endpoint that may be represented in a data unit of the protocol. For example, 192.168.1.1 is an IP protocol address represented in a human readable format that may be represented in an address portion of an IP header to identify a source and/or a destination IP protocol endpoint. A protocol address differs from a symbolic identifier, defined below, in that a symbolic identifier, with respect to a network protocol, maps to a protocol address. Thus, "www.mynode.com" may be a symbolic identifier for a node in a network when mapped to the protocol address 192.168.1.1. An identifier may be both a symbolic identifier and a protocol address depending on its role with respect to its use for a particular network protocol.

Since a protocol endpoint is included in a node and is accessible via a network via a network interface, a protocol address identifies a node and identifies a network interface of the node. A network interface may include one or more NICs operatively coupled to a network.

Those skilled in the art will understand upon reading the descriptions herein that the subject matter disclosed herein is not restricted to the network protocols described and/or their corresponding OSI layers.

As used herein, the term "communication" refers to data exchanged via a network protocol along with an identifier that identifies a user as a sender of the data and/or as a receiver of the data. The identifier is included in a data unit of the network protocol and/or in a message transported by the network protocol. The network protocol is referred to herein as a "communications protocol". The sender is referred to herein as a "contactor". The receiver is referred to herein as a "contactee". The terms "contactor" and "contactee" identify roles of "communicants" in a communication. The contactor and the contactee are each a "communicant" in the communication. An identifier that identifies a communicant in a communication is referred herein as a "communicant identifier". The terms "communicant identifier" and "communicant address" are used interchangeably herein. A communicant identifier that identifies a communicant in a communication exchanged via a communications protocol is said to be in an identifier space or an address space of the communications protocol. The data in a communication may include text data, audio data, image data, and/or a program component.

A communications protocol defines one or more rules, conventions, and/or vocabularies for constructing, transmitting, receiving and/or otherwise processing a data unit of and/or a message transported by the communications protocol. Exemplary communications protocols include a simple mail transfer protocol (SMTP), a post office protocol (POP), an instant message (IM) protocol, a short message service (SMS) protocol, a multimedia message service (MMS) protocol, a Voice over IP (VOIP) protocol. Any network protocol that specifies a data unit and/or transports a message addressed with a communicant identifier is or may operate as a communications protocol. In a communication, data may be exchanged via one or more communications protocols. Exemplary communicant identifiers include email addresses, phone numbers, multi-media communicant identifiers such as SKYPE® IDs, instant messaging identifiers, MMS identifiers, and SMS identifiers.

A user in the role of a communicant interacts with a communications agent to receive data addressed to the user in a communication. Alternatively or additionally, a user in the role of a communicant interacts with a communications agent to send data addressed to another communicant in a communication. More generally, the term "communications agent" refers to a component or application that operates in an execution environment to receive, on behalf of a contactee, a communicant message address to the contactee by a communicant identifier in the communication. The communications agent interacts with the contactee communicant in presenting and/or otherwise delivering the communicant message. Alternative or additionally, a communications agent operates in an execution environment to send, on behalf of a contactor, a communicant message in a communication addressed to a contactee by a communicant identifier in the communication. A communications agent that operates on behalf of a communicant in the role of a contactor and/or a contactee as described above is said, herein, to "represent" the communicant.

A "communicant message" data spoken, written, and/or acted by a contactor for a contactee. The data is received by a communications agent representing the contactor and is further received and/or to be received in a communication by a communications agent to present via an output device to the contactee identified in the communication by a communicant identifier. Examples of communicant messages include text written by a contactee in an email and/or an instant message and a spoken message by a contactee included in an audio communication by a VoIP client. To be clear attachments, data unit headers, message headers, communication session control data, and/or connection data for setup and management of a communication are not communicant messages as defined herein.

The term "communicant alias" as used herein refers to an identifier of a communicant in a communication where the communicant alias is not a communicant identifier in an address space of a communication protocol via which the communication is exchanged.

The term "attachment" as used herein refers to data, that is not a communicant message, exchanged in a communication from a sending communications agent and/or communications service to a recipient communications agent and/or communications service. An attachment may be, for example, a copy of a file stored and/or otherwise represented in a file system and/or in another data store in an execution environment that includes a communications agent included in exchanging the attachment in a communication. A resource sent as an attachment is data that is typically not presented "inline" in a communicant message. Email attachments are perhaps the most widely known attachments included in communications. An email attachment is a file or other data resource sent in a portion of an email separate from a communicant message portion. As defined, other communicant messages may be sent in other types of communications along with one or more attachments.

A "communications request", as the term is user herein, refers to request sent by a communications agent via a communications protocol. A "communications response", as the term is user herein, refers to any response corresponding to a communications request. A communications response may be transmitted via the same communications protocol as its corresponding communications request, a different communications protocol, a web protocol, and/or via any other suitable network protocol. A "communications service", as the term is used herein, refers to a recipient of a communications request that is included in performing the request. Performing the request may include sending a service request based on the communications request to a service application included in performing the request. A communications service and/or a service application included in performing a communications request may generate a communications response to the request.

"Service application", as the term is used herein, refers to any application that provides access to a resource. "Resource", as the term is user herein, refers to a data entity, a hardware component, a program component, and/or service. A service request is a request to a service application to get, create, modify, delete, move, and/or invoke a resource. A response to a service request is referred to as a service response. Data in a service response is a resource. A communications request is a type of service request.

A "web protocol", as the term is used herein, refers to any version of a hypertext transfer protocol (HTTP) and/or any version of a HTTP secure (HTTPS) protocol. A "user agent", as the term is used herein, refers to a client which initiates a request via a web protocol. Examples include web browsers, HTML editors, spiders (web-traversing robots), or other end user tools. A "web request", as the term is used herein, refers to a request initiated by a user agent. A "web service", as the term is used herein, refers to a recipient of a web request. A web service generates a response to the request. A "web response", as the term is used herein, refers to any response that corresponds to a web request. A web response may be transmitted via the same web protocol as its corresponding web request, a different web protocol, via a communications protocol, and/or via any other suitable network protocol. A web request is a type of service request.

A "service provider", as the term is used herein, refers to any entity that owns, maintains, and/or otherwise provides a web service, communications service, and/or other network accessible service application. The term "service provider system" is used interchangeably with services and facilities that host a web service and/or other service application of a service provider. For example, a service provider system may include a server farm, a content delivery network, a database, a firewall, etc.

Figure 2A:
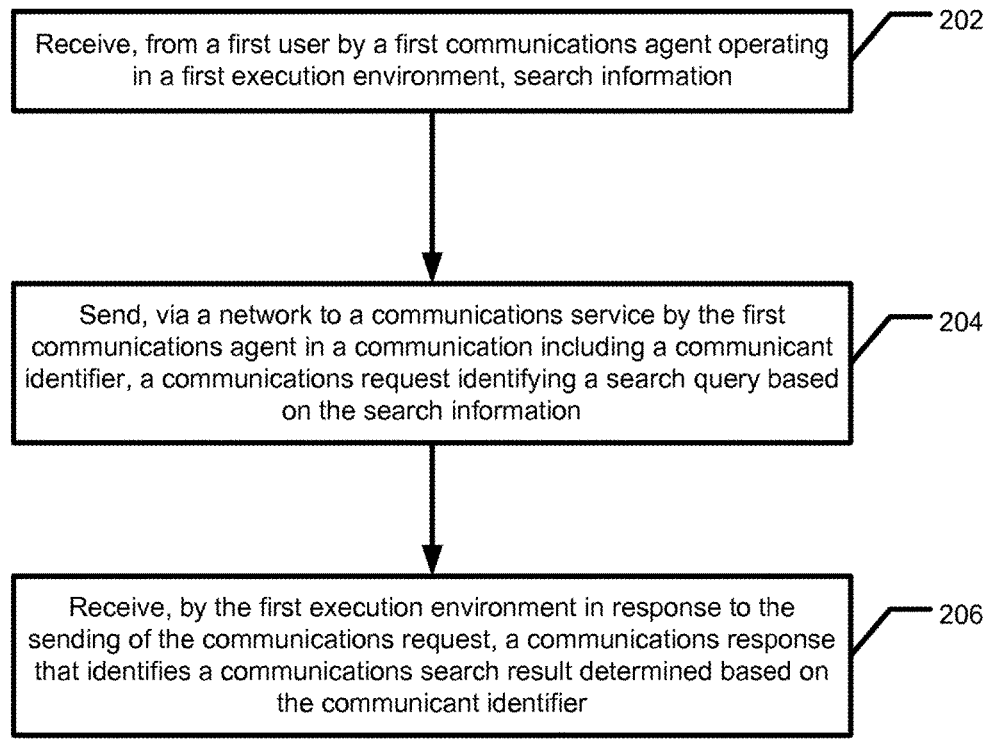
FIG. 2A is a flow diagram illustrating a method for processing a search query exchanged via a communications protocol according to an aspect of the subject matter described herein.
Figure 2B:
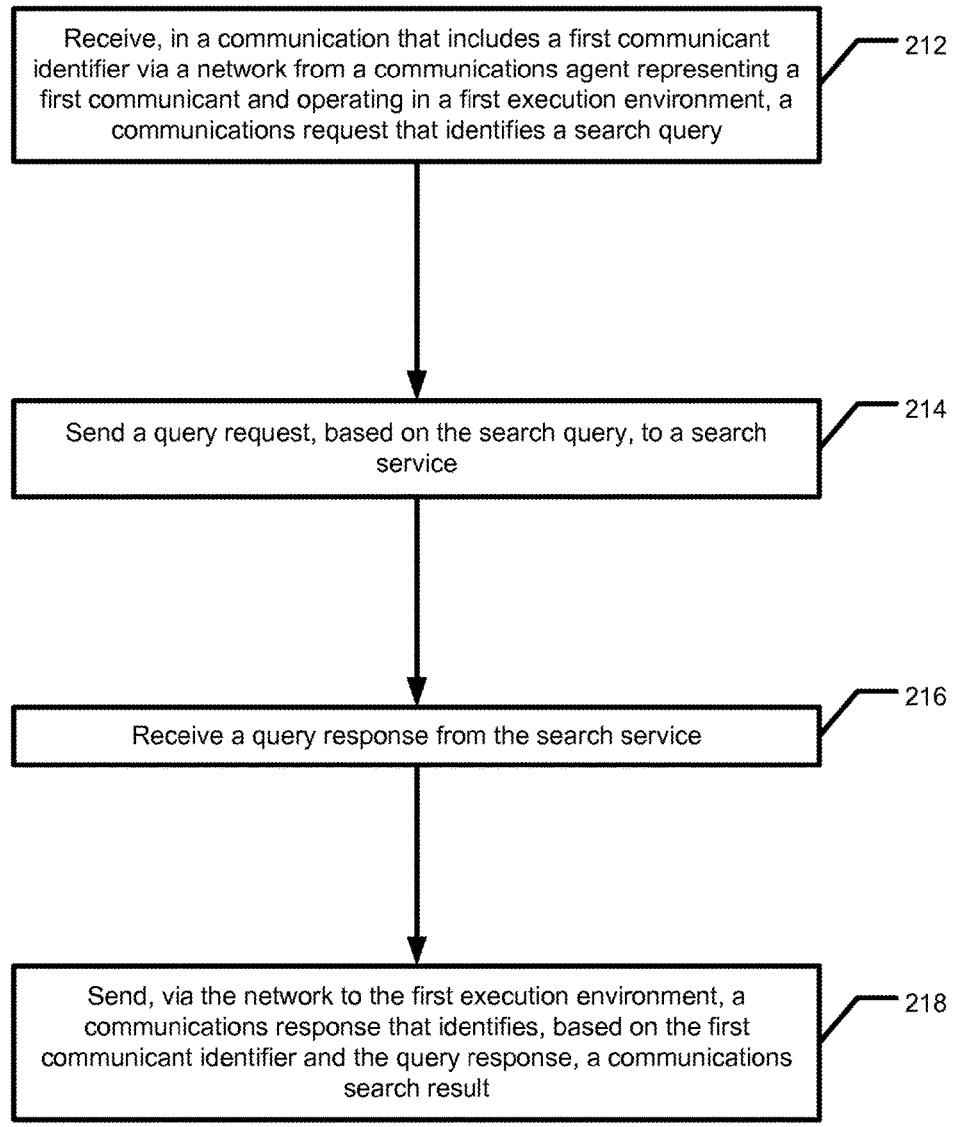
FIG. 2B is a flow diagram illustrating a method for processing a search query exchanged via a communications protocol according to an aspect of the subject matter described herein.
Figure 3A:
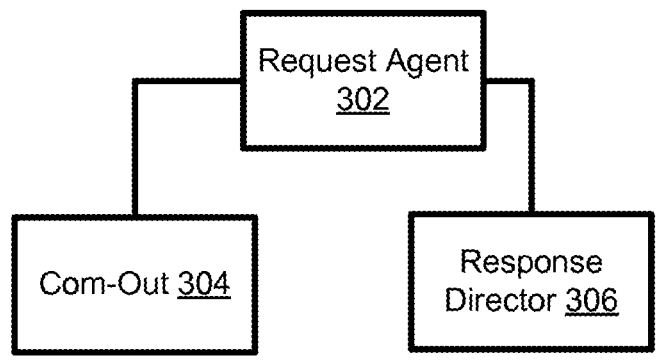
FIG. 3A is a block diagram illustrating an arrangement of components for processing a search query exchanged via a communications protocol according to another aspect of the subject matter described herein.
Figure 3B:
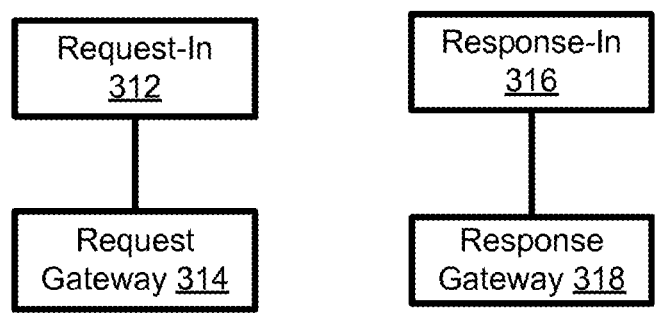
FIG. 3B is a block diagram illustrating an arrangement of components for processing a search query exchanged via a communications protocol according to another aspect of the subject matter described herein.

FIG. 3A illustrates an arrangement of components in a system that operates in an execution environment, such as execution environment 102 in FIG. 1. The arrangement of components in the system operates to perform the method illustrated in FIG. 2A. The system illustrated includes a request agent component 302, a com-out component 304, and a response director component 306. A suitable execution environment includes a processor, such as processor 104, to process an instruction in at least one of a request agent component, a com-out component, and a response director component. FIG. 3B illustrates an arrangement of components in a system that operates to perform the method illustrated in FIG. 2B. The system illustrated includes a request-in component 312, a request gateway component 314, a response-in component 316, and a response gateway component 318. A suitable execution environment includes a processor, such as processor 104, to process an instruction in at least one of a request-in component, a request gateway component, a response-in component, and a response gateway component.

Some components, illustrated in the drawings are identified by numbers with an alphanumeric suffix. A component may be referred to generically in the singular or the plural by dropping a suffix of a portion thereof of the component's identifier. For example, execution environments; such as requesting execution environment 401a, relay execution environment 401b, service execution environment 401c, and their adaptations and analogs; are referred to herein generically as an execution environment 401 or execution environments 401 when describing more than one. Other components identified with an alphanumeric suffix may be referred to generically or as a group in a similar manner.

Figure 4A:
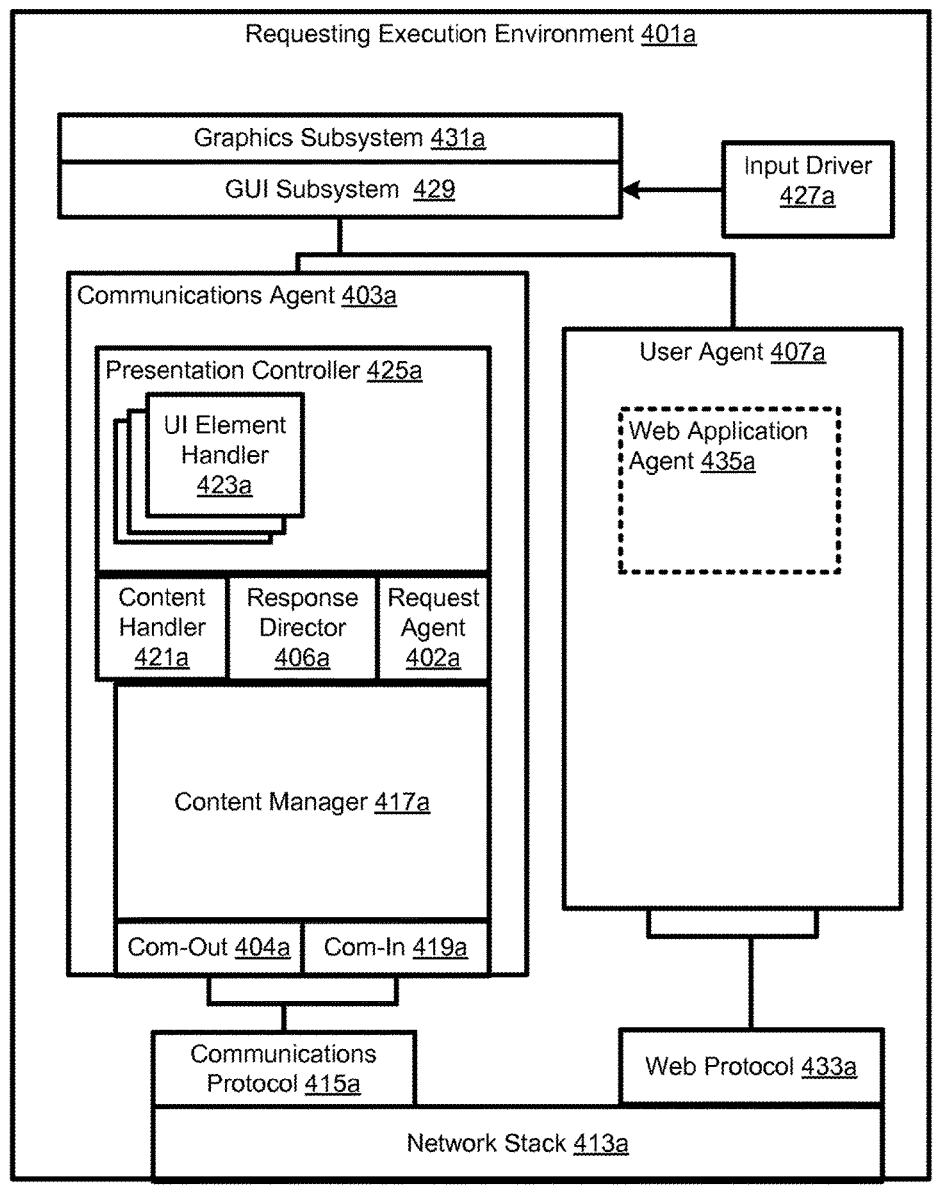
FIG. 4A is a block diagram illustrating an arrangement of components for processing a search query exchanged via a communications protocol according to another aspect of the subject matter described herein.
Figure 4B:
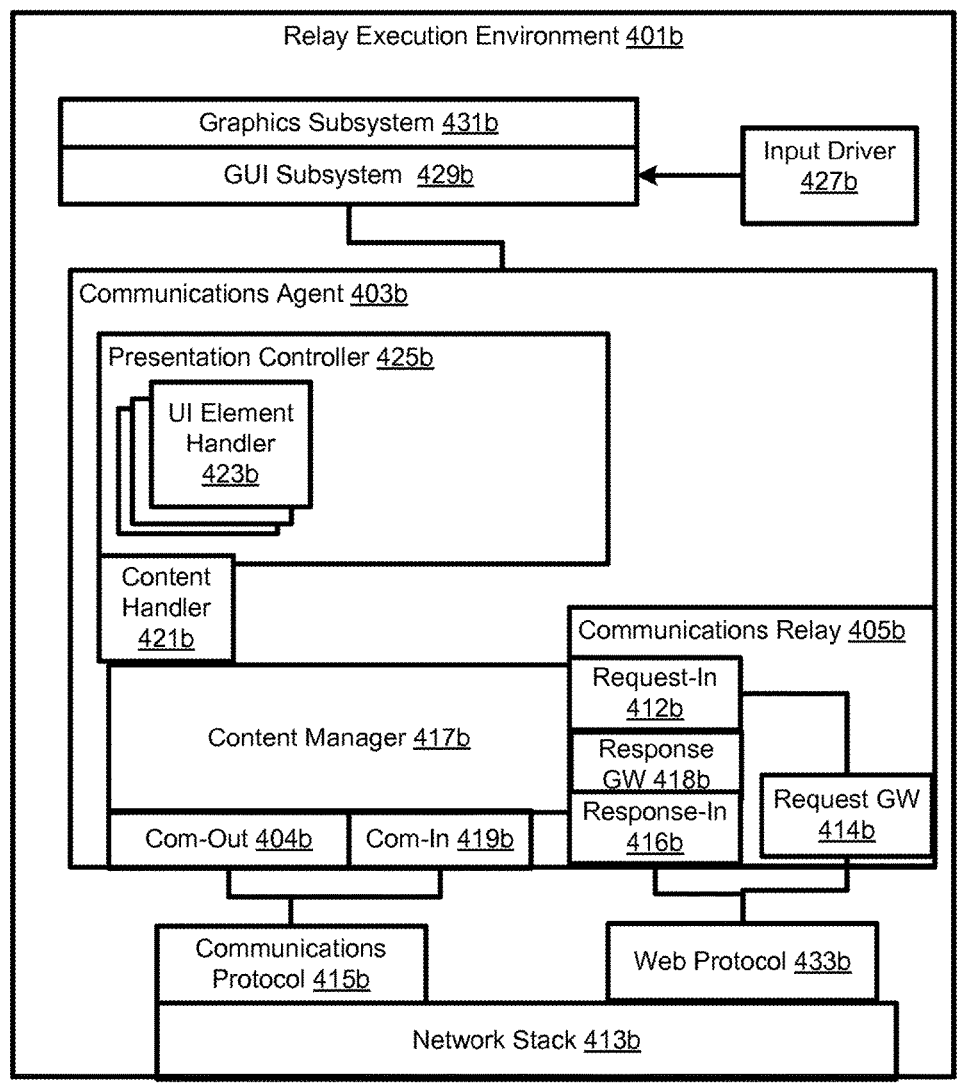
FIG. 4B is a block diagram illustrating an arrangement of components for processing a search query exchanged via a communications protocol according to another aspect of the subject matter described herein.
Figure 4C:
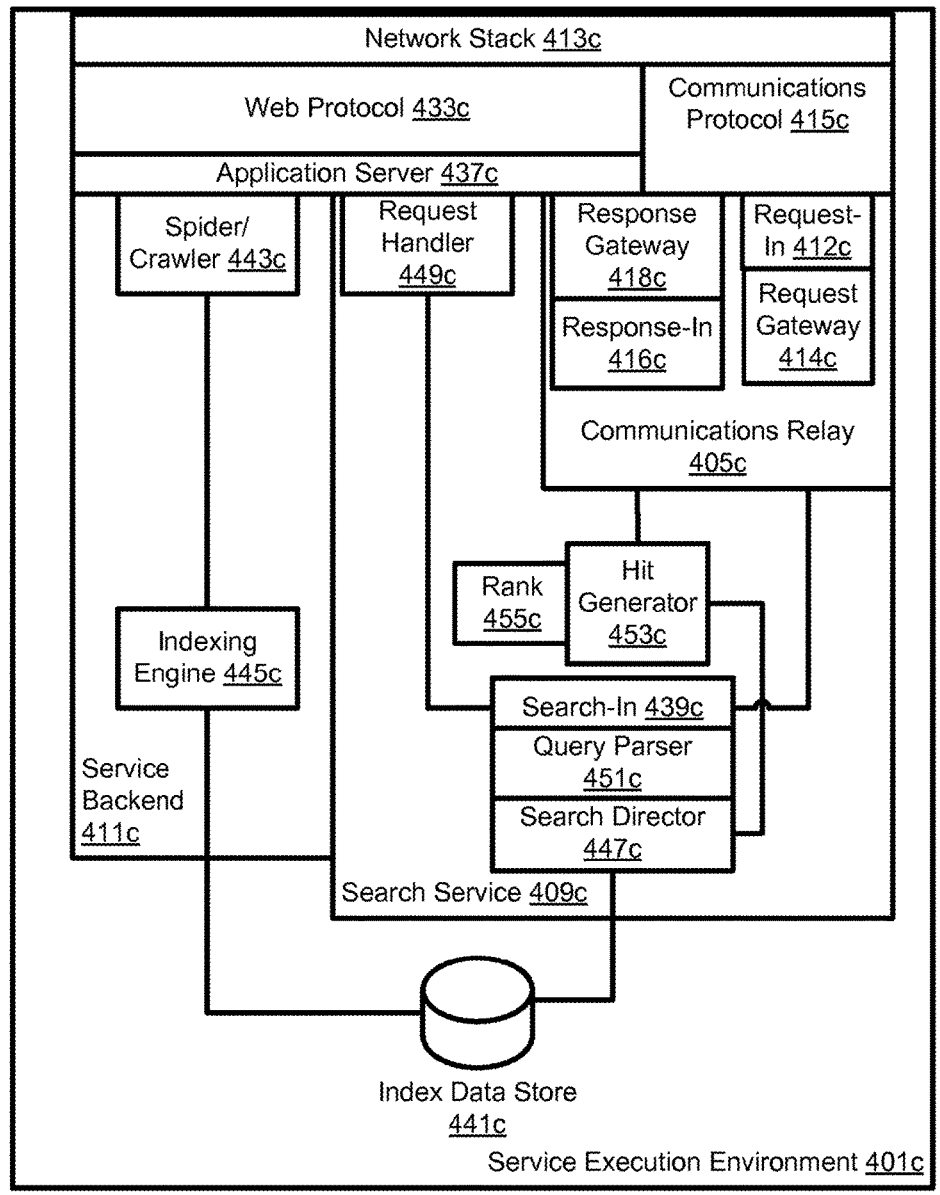
FIG. 4C is a block diagram illustrating an arrangement of components for processing a search query exchanged via a communications protocol according to another aspect of the subject matter described herein.

Some or all of the exemplary components illustrated in FIG. 3A and in FIG. 3B, their adaptations, and/or their analogs may operate in a number of execution environments to perform the method illustrated in FIG. 2A and/or the method illustrated in FIG. 2B. FIG. 4A is a block diagram illustrating the components of FIG. 3A and/or analogs of the components of FIG. 3A that are operable in a first execution environment referred to herein for illustrative purposes as a requesting execution environment 401a to perform the method illustrated in FIG. 2A. FIG. 4B is a block diagram illustrating the components of FIG. 3B and/or analogs of the components of FIG. 3B that are operable in a second execution environment referred to herein for illustrative purposes as a relay execution environment 401b to perform the method illustrated in FIG. 2B. FIG. 4C is a block diagram illustrating the components of FIG. 3B and/or analogs of the components of FIG. 3B that are operable in a third execution environment referred to herein for illustrative purposes as a service execution environment 401c to perform the method illustrated in FIG. 2B. In an aspect, the components of FIG. 3B and/or analogs of the components of FIG. 3B may operate in relay execution environment 401b and in service execution environment 401c in a distributed fashion. Some components illustrated in FIG. 3B may operate in relay execution environment 401b while others operate in service execution environment 401c. One or more components may operate partially in relay execution environment 401b and partially in service execution environment 401c.

Each execution environment 401 in FIGS. 4A-C is included in and/or otherwise is provided by one or more nodes. FIG. 1 illustrates key components of an exemplary device that may at least partially provide and/or otherwise may be included in an execution environment. The components illustrated in FIGS. 4A-C may be included in or may otherwise be combined with the components of FIG. 1 to create a variety of arrangements of components according to the subject matter described herein.

As stated, the various adaptations of the arrangement in FIG. 3A as well as the various adaptations of the arrangement in FIG. 3B illustrated and described herein are not exhaustive. For example, those skilled in the art will see, based on the description herein, that arrangements of components to perform the method illustrated in FIG. 2A and the method illustrated in FIG. 2B may each be distributed across more than one node and/or execution environment.

Figure 5:
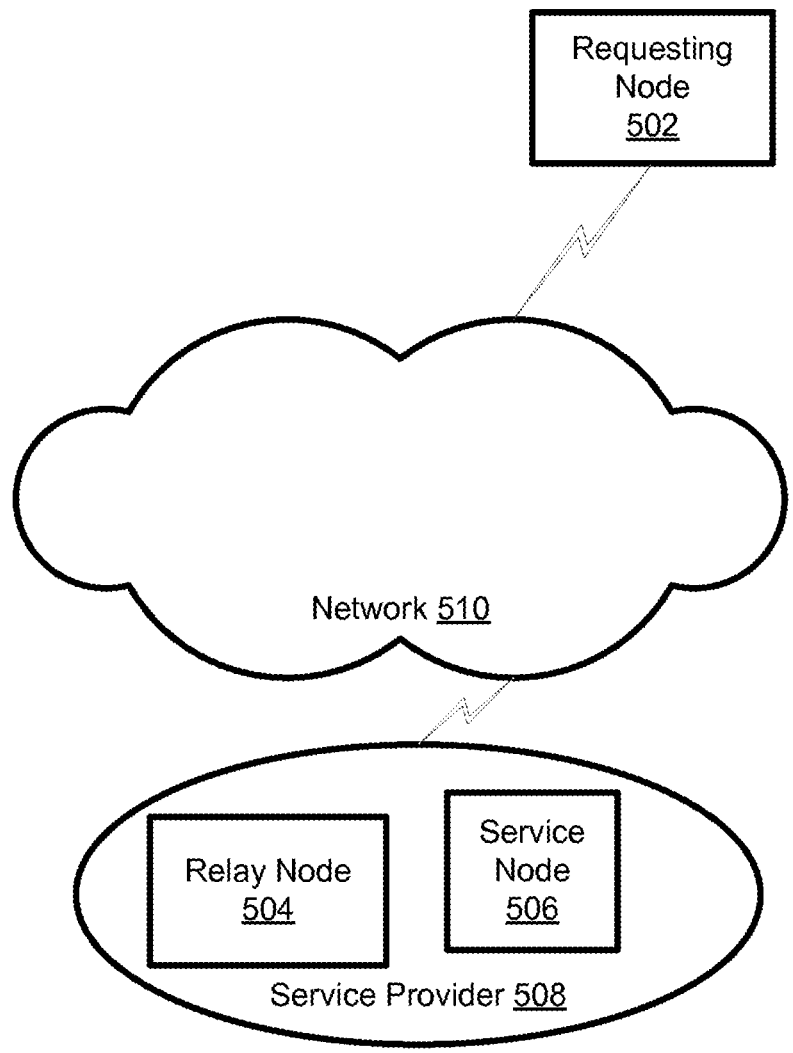
FIG. 5 is a network diagram illustrating a system for processing a search query exchanged via a communications protocol according to another aspect of the subject matter described herein.

FIG. 5 illustrates a first node referred to herein for illustrative purposes as a requesting node 502, a second node referred to herein for illustrative purposes as a relay node 504, and a third node referred to herein for illustrative purposes as a service node 506 as exemplary devices that each may be included in and/or otherwise may provide an instance, adaptation, and/or analog of an execution environment 401 in any of FIGS. 4A-C. Requesting execution environment 401a may include and/or may otherwise be provided at least in part by requesting node 502. Relay execution environment 401b may include and/or may otherwise be provided, at least in part, by relay node 504. Service execution environment 401c may include and/or may otherwise be provided at least in part by service node 506.

FIG. 5 illustrates relay node 504 and service node 506 included in and/or otherwise provided by a service provider system 508, operated and/or otherwise provided by a business, other organization, individual, or other legal entity. Service provider system 508 may include one or more execution environments including and/or provided by one or more nodes. Service provider system 508 may include a server farm, a content delivery network, firewalls, and the like. A service provider system may be distributed throughout some or all of a network, illustrated in FIG. 5 by network 510. Those skilled in the art will understand that relay execution environment 401b of relay node 504 and service execution environment 401c of service node 506 may be provided by different service provider systems. Requesting execution environment 401a may include and/or may otherwise be provided at least in part by requesting node 502. Requesting execution environment 401a and service provider system 508 are operatively coupled to a network 510 via respective network interface components in requesting node 502 and in one or both of relay node 504 and service node 506 enabling requesting execution environment 401a to exchange data via network 510 with one or both of relay execution environment 401b of relay node 504 and service execution environment 401c of service node 506.

FIGS. 4A-C illustrate various applications in respective execution environments 401. FIG. 4A illustrates an adaptation of the arrangement of components in FIG. 3A in a communications agent 403a application. Communications agent 403a may operate in requesting execution environment 401a of requesting node 502 on behalf of a requesting communicant to communicate with a communications relay, illustrated in FIG. 4B operating in communications agent 403*b* as communications relay 405*b* and also illustrated in FIG. 4C operating in service execution environment 401*c* of service node 506 as communications relay 405*c*. FIG. 4A also illustrates a user agent 407*a* application, such as a web browser. User agent 407*a* may operate in requesting execution environment 401*a* of requesting node 502 to communicate with one or more web services, such as search service 409*c*, illustrated in FIG. 4C operating, as a web accessible application, in service execution environment 401*c* of service node 506. As described, FIG. 4C also illustrates an alternative and/or additional communications relay 405*c* that may interoperate with communications relay 405*b*. In another aspect, one or both of the communications relays 405 may operate without interoperating with the other. Those skilled in the art will further understand, that applications, illustrated in relay execution environment 401*b* by communications relay 405*b*, and applications, illustrated in service execution environment 401*c* by search service 409*c*, and communications relay 405*c*, their adaptations and/or their analogs may operate together in a single execution environment 401.

A communications relay 405 may be and/or may include one or more of a mail server, relay, gateway, and/or proxy; an instant message server, relay, gateway, and/or proxy; a voice of IP (VoIP) switch, relay, gateway, and/or proxy, a presence server, relay, gateway, and/or proxy; and a video switch, relay, gateway, and/or proxy—to name a few examples. Those skilled in the art will understand that a communications relay 405 may be included in and/or otherwise may be an adaptation of a communications agent. As such, communications relay 405*b* may represent a communicant by being included in communications agent 403*b*.

Applications in FIG. 4A-C, operating in respective execution environments 401 may interoperate via respective network stacks 413. Applications may exchange data via network 510 via one or more network protocols such as a communications protocol and/or a web protocol. FIGS. 4A-C each illustrates a respective communications protocol component 415 exemplifying a subsystem to exchange data via network 510 according to one or more communications protocols, such as simple mail transfer protocol (SMTP), an instant messaging protocol, and/or a real-time voice and/or video protocol. A communication may include an exchange of one or more types of data and may use one or more communications protocols in exchanging the one or more types of data via network 510.

Instances, adaptations, and/or analogs of applications in FIG. 4A-C may communicate via a request/reply protocol, a data streaming protocol, a session and/or connection-oriented protocol, a connectionless protocol, a real-time communications protocol, an asynchronous communication, a store and forward communications protocol, a reliable delivery communications protocol, a best-effort delivery communications protocol, and/or a secure protocol, to name a few communications options.

FIGS. 4A-B illustrate respective communications agents 403 including respective content manager components 417. A content manager component 417 may interoperate with communications protocol layer component 415 and/or network stack 413 to receive data in one or more communications via network 510 in FIG. 5 with another communications agent, a communications relay, and or other compatible component in another execution environment and/or node. A content manager component 417 may be operatively coupled, via a com-in component 419, to a communications protocol component 415 to receive data from the other execution environment and/or the other node.

Data received in a communication may include one or more content types. Exemplary content types include plain text, markup such as hypertext markup language (HTML), audio data, image data, and/or executable data. Executable data may include script instruction(s), byte code, and/or machine code. In FIG. 4A and in FIG. 4B, communications agent 403*a* and communications agent 403*b* may each include one or more content handler components 421 to process data received according to its content type. A content type may be identified by a MIME type identifier and/or a file type extension, for example. Exemplary content handler components 421 include a text/html content handler component to process HTML representations; an application/xmpp-xml content handler component to process extensible messaging and presence protocol (XMPP) streams including presence tuples, instant messages, and audio content handlers including and/or that may in operation retrieve suitable codices; one or more video content handler components to process video representations of various types; and still image data content handler components to process various image data representations.

Content handler component(s) 421 process data based on a content type of the data and may transform the data and/or generate from the received data to provide and/or otherwise identify to one or more user interface element handler components 423. One or more user interface element handler components 423 are illustrated in respective presentation controller components 425 in FIGS. 4A-B. A presentation controller 425 may manage visual, audio, and other types of output for its including application as well as receive and route detected user and other inputs to components and extensions of its including application. A user interface element handler component 423 may operate at least partially in a content handler component 421 such as a text/html content handler component and/or a script content handler component. Additionally or alternatively, a user interface element handler component in an execution environment 401 may be received in a communication. For example, a communication, such as an email, may include an HTML content type portion and a script content type portion.

Figure 6A:
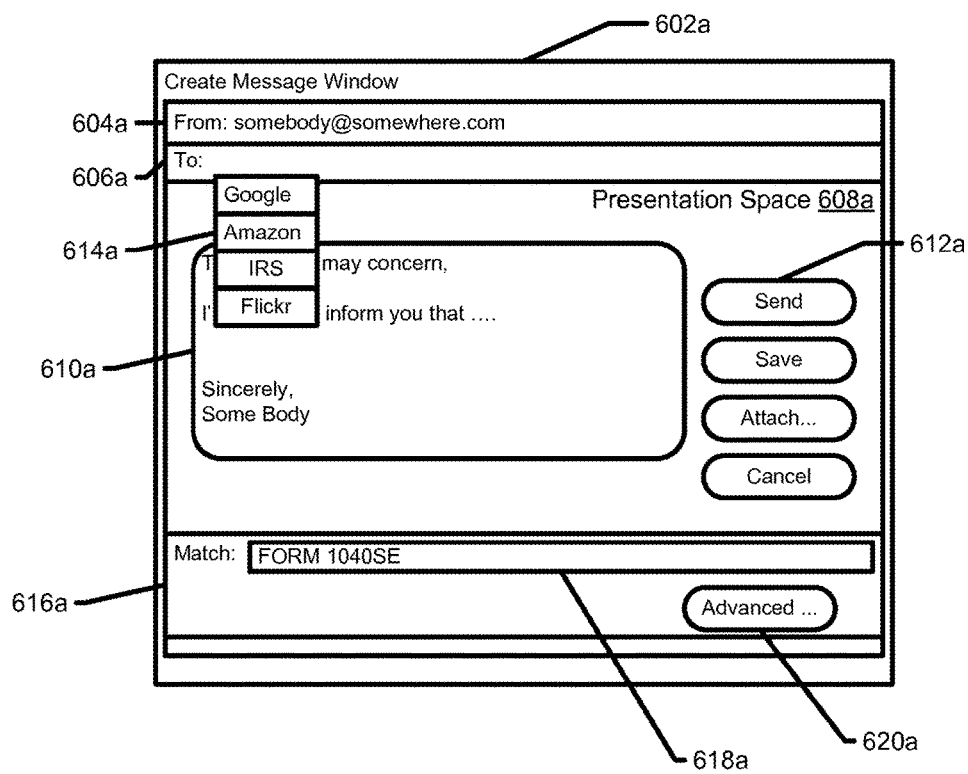
FIG. 6A is a diagram illustrating a user interface presented via a display according to another aspect of the subject matter described herein.
Figure 6B:
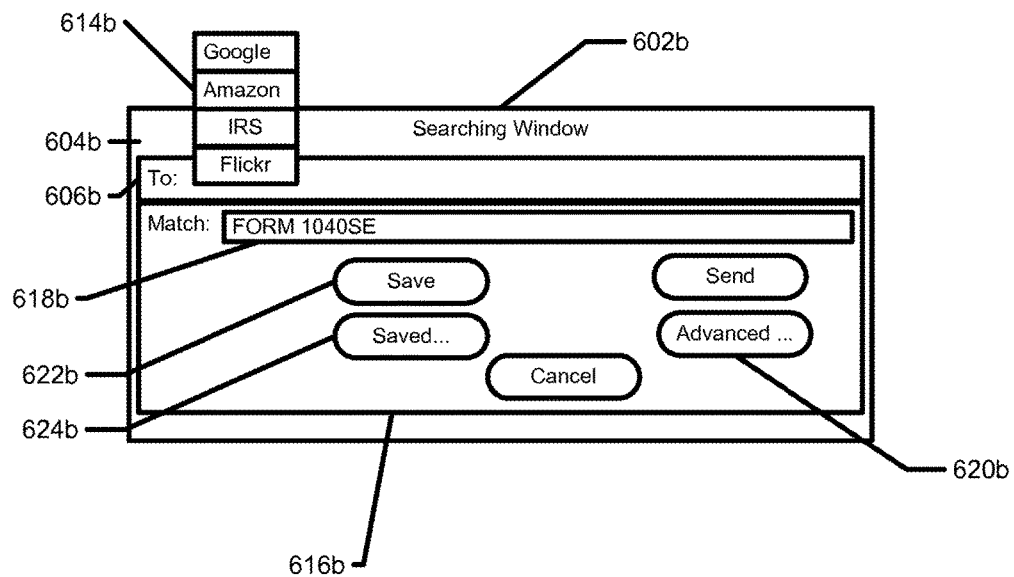
FIG. 6B is a diagram illustrating a user interface presented via a display according to another aspect of the subject matter described herein.

FIGS. 6A-B illustrate various windows 602 presentable in a presentation space of a display device, such as output device 130 in FIG. 1, by a communications agent 403. A communications agent create message window 602*a*, in FIG. 6A, includes a contactor user interface (UI) element 604*a* including an identifier of a communicant in the role of a contactor in a communication represented by the create message window 602*a*. Create message 602*a*, in FIG. 6A, also includes a contactee UI element 606*a* to present one or more contactee identifier(s) identifying one or more communicants in the role of contactee(s) included in the communication. A presentation space 608*a* is provided in create message window 602*a* to present a communicant message UI element 610*a* that may include a presentation of a communicant message addressed to one or more contactees identified in the contactee UI element 606*a*. The presentation space 608*a* may also be provided to present one or more UI controls to exchange data in and/or otherwise manage the data in the communication. A send UI element 612*a* illustrates an exemplary UI control element that may correspond to user input to send data in a communication to one or more identified contactees.

In FIG. 4A, data to send in a communication to a communications agent and/or to a request-in component 412 may be received by one or more content handler component(s) 421*a* operating in requesting execution environment

401a to transform the data into one or more data representations suitable to transmit in the communication and/or suitable to process by a communications relay 405, such as in relay execution environment 401b and/or in service execution environment 401c. The one or more data representations may be provided to content manager component 417a to send in the communication to the communications relay 405. Content manager component 417a may package and/or otherwise prepare for packaging the one or more data representations in a data unit or message formatted according to a communications protocol of the communications agent 403a. Communications protocol component 415a may send the data according to the specification(s) of the communications protocol. Content manager component 417a may alternatively or additionally encode and/or otherwise transform one or more of the data representations to send in a data stream such as voice stream and/or a video stream to communicate in the communication to a communications agent via a network.

Content manager component 417a operating in requesting execution environment 401a may provide the packaged, encoded, and/or transformed data to communications protocol component 415a via a com-out component 404a. Com-out component 404a, as described above, operatively couples communications agent 417a to communications protocol component 415a according to an interface provided by communications protocol component 415a to send data in a communication. Communications protocol component 415a may further package and/or otherwise transform the data to send via network stack 413a to deliver via network 510 to a communications relay 405 operating in another execution environment.

A communicant in a communication may be identified by a communicant identifier in an address space of a communications protocol. In one aspect, information identifying a communicant identifier may be received from a communicant of a communications agent in an execution environment. In FIG. 4A, presentation controller 425a and/or a UI element handler 423a, presenting and/or managing interaction with contactor UI element 604 in FIG. 6A presented by requesting execution environment 401a, may receive a contactor alias in response to a user input corresponding to contactor UI element 604. The user of requesting execution environment 401a may enter a contactor alias, identifying a communicant identifier such as "somebody@somewhere.com", via a keyboard and/or may select a predefined communicant alias presented in a selection UI control element via a UI element handler component 423a. The user input may be detected by input driver 427a. Corresponding input information may be routed to presentation controller 425a by GUI subsystem 429a. GUI subsystem 429a may send presentation information to a display device via a graphics subsystem 431a. Communications agent 403a may identify and/or otherwise receive the communicant identifier, "someone@somewhere.com". Other communicant identifiers, such as for one or more contactees, may be received similarly and/or in any suitable manner.

Data may be sent in a communication according to a form or type of the communication and/or other attribute of the communication such as a security attribute, the amount of data to be sent, a priority setting, a task setting, and the like. Some forms of communication do not require a session and/or connection between communications agents and/or request-in components in a communication in order to exchange data in the communication, while others do. An email and/or instant message may use a store and forward model of delivery.

Data may be sent in a communication in response to a communicant input. A contactor may provide an input corresponding to send UI element 612a in FIG. 6A. The input may be received by presentation controller 425a, in FIG. 4A, and/or by one or more UI element handlers 423a corresponding to send UI element 612a. In response to detecting the input, presentation controller 425a may provide data to be sent in the communication to one or more content handler components 421a according to the content type(s) of the data to be sent.

The one or more content handler components 421a may encode, format, and/or otherwise transform the data to send in a communication. The one or more content handler components 421a may provide data to be sent to content manager 417a, instructing content manager component 417a to send the data in the communication to deliver to another communications agent and/or to a communications relay 405. Content manager component 417a interoperating with com-out component 404a may further format and/or transform the data to prepare it for processing by a communications protocol component 415a. Communications protocol component 415a may send the data, such as an email, in one or more data units of a communications protocol to transmit in the communication. For example, a communications protocol component 415a may send the data via a simple mail transfer protocol (SMTP) and/or a post office protocol (POP) to deliver to a communications relay 405 via network 510.

For session-oriented and/or connection-oriented communication a session and/or connection may be established if a session/connection has not already been established. Data may be sent to deliver to a communications agent and/or a communications relay 405 identified based on a contactee communicant identifier during session and/or connection setup. For example, for a voice communication a voice communication may be established via a session initiation protocol based on a user identifier, such as a phone number. Communications protocol component 415a operating in requesting execution environment 401a may identify a communications agent and/or a communications relay by communicating with one or more nodes in network 510 according to a session initiation protocol based on a communicant identifier of a contactee. Communications protocol component 415a may transmit, for example, a message to a communications relay 405b in relay execution environment 401b, based on a communicant identifier for a contactee in the communication.

Once a communication session is established, such as a voice session, data may be sent according to the session communications protocol, such as RTP. Data may be sent according to a session initiation protocol in the communication to manage the voice communication session and/or to exchange text, image, and/or other data outside of the voice session.

As described above a communications agent 403b may send data in a communication to another communications agent, such as communications agent 403a, in FIG. 4A, in manner similar to that described above with respect to communications agent 403a.

FIG. 4A includes a second application illustrated by user agent 407a. As defined above, user agent 407a may be a web browser. User agent 407a in FIG. 4A and search service 409c in FIG. 4C may interoperate via respective network stacks 413 in requesting execution environment 401a and service execution environment 401c. User agent 407a and search service 409c may communicate via a web protocol. FIG. 4A and FIG. 4C respectively illustrate web protocol components 433. Web protocol components 433 in requesting execution environment 401a and in service execution environment 401c may exchange data via one or more versions of HTTP.

User agent 407a, in FIG. 4A, may receive some or all of web application agent 435a in one more web responses sent from search service 409c, in FIG. 4C via network stacks, network interface components, and web protocol components in the respective execution environments. In FIG. 4A, user agent 403a may interoperate with web protocol component 433a and/or network stack 413c to receive the web response(s) including some or all of web application agent 435a.

Web application agent 435a may include a web page or other data representation for presenting a user interface for search service 409c. The web page may include and/or reference data represented in one or more formats including hypertext markup language (HTML) and/or other markup languages, ECMAScript or other scripting languages, byte code, image data, audio data, and/or machine code to name just a few valid data representations depending on the capabilities of a receiving user agent.

Search service 409c may operate as in a web service. The web service may respond to requests other than search queries. In response to an HTTP request including a command received from user agent 407a, an application server 437c, in FIG. 4C, in the web service may invoke a model subsystem (not shown) including one or more command handler components to perform command specific processing. The model subsystem may include any number of command handler components, such as a search-in component 439c, that operate to dynamically generate data and/or retrieve data from a model database, such as index data store 441c, based on the command identified in the HTTP request. The application server 437c and/or the model subsystem may invoke one or more response generator components, such as hit generator component 453c and/or a response gateway component 418c that generate a command response to the received command. One or more response gateway components and/or response-in components may invoke a template engine component (not shown) to identify one or more templates and/or other static data to combine with data received from one or more command handler component(s) generated in processing the command. The one or more response generator component(s) interoperate with the application server 437c to return a HTTP response including a command response generated from processing the command identified in the HTTP request. The command response may be represented in one or more data formats suitable for a user agent, such as user agent 407a. The application server 437c may receive command response data from one or more response generator components as one or more HTTP entities, and/or one or more HTTP representations. Alternatively or additionally, the application server 437c may transform data from one or more response generator component(s) into one or more HTTP entities and/or HTTP representations. The application server 437c may send the one or more HTTP entities in an HTTP response via web protocol component 433c, in response to the HTTP request received from user agent 407a. Some or all of web application agent 435a may be sent to user agent 407a via the web service in the manner described.

One or more HTTP responses including one or more representations of some or all of web application agent 435a may be received by user agent 407a via web protocol component 433a and network stack 413a. In FIG. 4, user agent 407a may include one or more content handler components to process received HTTP entities according to their data types, typically identified by MIME-type identifiers. Exemplary content handler components that operate in and/or with user agent 407a include a text/html content handler component for processing HTML representations; an application/xmpp-xml content handler component for processing XMPP streams including presence tuples, instant messages, and publish-subscribe data as defined by various XMPP specifications; one or more video content handler components for processing video representations of various types; and still image data content handler components for processing various image data representations. Content handler component(s) in user agent 407a process received HTTP entities and may provide data from the HTTP entities to one or more user interface element handler components included and/or otherwise interoperating with user agent 407a.

User agent 407a may manage visual, audio, and other types of output. User agent 407a may send presentation information to present one or more UI elements via an output device, such as a display device. The display device may include a presentation space to represent a UI element, such as a browser window or tab. The UI element may be presented by and/or on behalf of user agent 407a, web application agent 435a, and/or search service 409c which may include and/or may be included in a web service.

FIGS. 4B-C illustrates respective web protocol components 433 interoperating with communications relays 405. A communications relay 405 may operate as a user agent in communicating with a web application such as search service 409c.

FIG. 4C illustrates search service 409c operatively coupled to web protocol component 433c to exchange data with one or more user agents, such as user agent 407a, in FIG. 4A, and/or communications relay 405b in FIG. 4B. In an aspect, search service 409c may be operatively coupled to a communications protocol component 415c as FIG. 4C illustrates. Search service 409c may exchange data in a communication with a communications agent, such as communications agent 403a, in FIG. 4A, and/or a communications relay 405b, in FIG. 4B.

Search services, such as illustrated in FIG. 4C, are well-known to those skilled in the art. Current search engines interoperate with indexing services. An indexing service may collect, parse, and store data to allow resources to be located via a search query by a search engine. Indexing services include crawlers, spiders, and categorization based on human input and judgment. While most current search services generate text indices of text based documents, some search services generate indices to locate audio, still image, and/or video media. Meta search engines interoperate other search engines to produce a combined search result. Some meta search engines do not create and/or store a local index, while others do. Cache-based search engines store an index along with copies of indexed resources. Text based services may operate based on a full-text index and/or based on a partial-text service. Indexing may be continuously performed or performed at intervals that are time-based and/or based on some other type of event. Continuous indexing, in some instances, may be performed in real-time by agents and/or proxies.

Search engine architectures vary in the way indexing may be performed. Those skilled in the art will understand that the subject matter described herein is not limited to the architecture and/or arrangement of components illustrated in FIG. 4C and described herein. For example, a search engine may be based on a suffix tree, a suffix array, an inverted index, a forward index, a citation index, an Ngram index, and/or a document-term matrix. Search services based on an inverted index are perhaps the most common.

An inverted index maps words to documents allowing documents that match one or more words or portions thereof in a query to be accessed directly. An inverted index may include information that identifies a count or measure or usage of a word in a document. This allows ranking of resources that match a particular query. Position information may be maintained to determine the proximity of terms in a query in a matching document. This may be used to rank search result, to determine a measure or indicator of relevance, and/or to match phrases in a query.

A forward index maps documents to words or search terms. A forward index is created in some search services in the process of creating and/or updating an inverted index.

Some search engines incorporate section recognition, which includes the identification of parts of a document, prior to tokenization. Section analysis may require the search engine to implement the rendering or presentation logic of each document to store in a presentation space. The document represented in the presentation space may be indexed instead of and/or in addition to the raw document. For example, some content on the Internet is presented via JavaScript.

In FIG. 4C, spider/crawler component 443c may access content to be indexed via network 510. In an aspect, spider/crawler component 443c receives URLs to construct requests to retrieve corresponding resources. Alternatively or additionally, spider/crawler component 443c may interoperate with one or more distributed agents by identifying URLs of resources to index to the agents via network 510. Resources retrieved by spider/crawler component 443c directly and/or indirectly via distributed agents may be stored in a data store (not shown) prior to indexing. Retrieved resources are provided to indexing engine 445c. Indexing engine 445c may perform index content of the retrieved resources by interoperating with one or more indexing agents included in and/or interoperating with distributed agents. Indexing agents (not shown), whether operating in service backend 411c or in a distributed architecture, may read and/or otherwise access resources retrieved by spider/crawler component 443c and/or its distributed agents, if any. Indexing engine 445c and/or any indexing agent may parse each resource identifying, in a text resource, words or terms. In an aspect, a word's location in a resource may be detected and stored in the index. Additional information such as font size, capitalization, and/or color may be identified. Further, whether a term is in a title, paragraph, table, or other section of a resource may be detected. Indexing engine 445c may create an index or a portion thereof, such as forward index. Indexing engine 445c may also detect hyperlinks in a resource. Hyperlink information may be kept in a links index in index data store 441c. A link index may identify for a link its location in a resource, a resource or portion thereof referenced by the link, and the content of the link typically presented when the resource is presented to a user. Link content may be added to the forward index.

Indexing engine 445c may generate an inverted index based on the forward index. A lexicon may be generated for use along with the inverted index in processing a search query by search director component 447c illustrated in search service 409c.

With reference to FIG. 2A, a block 202 illustrates that the method includes receiving, from a first user by a first communications agent operating in a first execution environment, search information. Accordingly, a system for processing a search query exchanged via a communications protocol includes means for receiving, from a first user by a first communications agent operating in a first execution environment, search information. For example, the arrangement in FIG. 3A, includes request agent component 302 that is operable for and/or is otherwise included in receiving, from a first user by a first communications agent operating in a first execution environment, search information. FIG. 4A illustrates request agent component 402a as an adaptation and/or analog of the request agent component 302 in FIG. 3A. One or more request agent components 402 operate in an execution environment 401. A system for processing a search query exchanged via a communications protocol includes one or more processors and logic encoded in one or more tangible media for execution by the one or more processors that when executed is operable for and/or is otherwise included in receiving, from a first user by a first communications agent operating in a first execution environment, search information.

Figure 7:
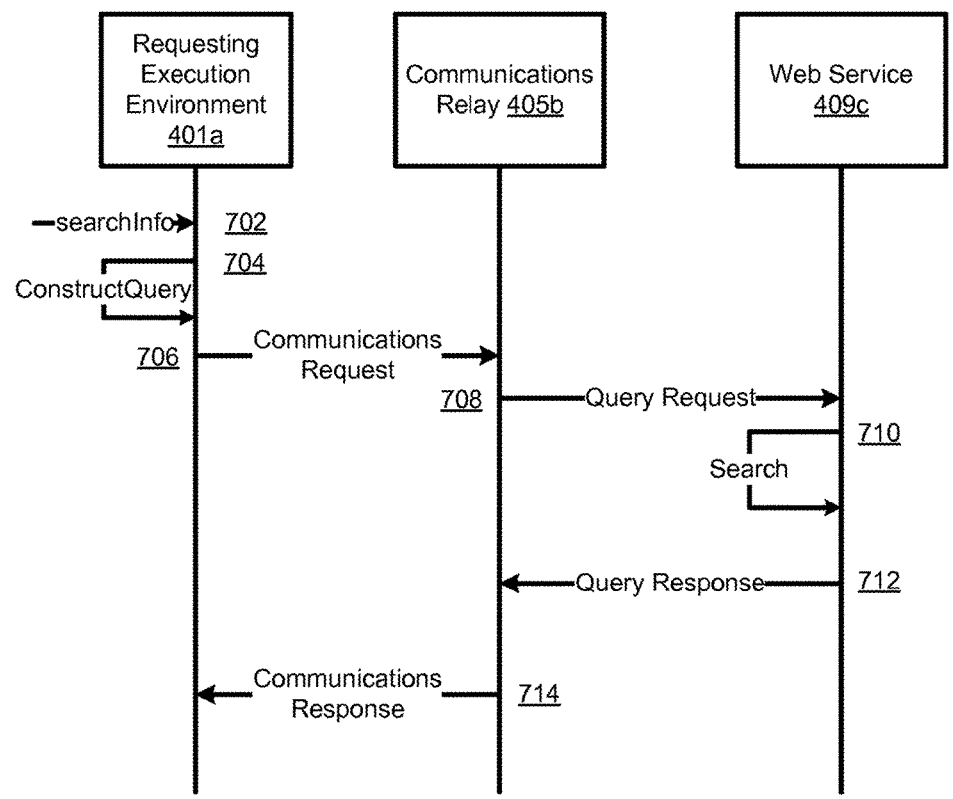
FIG. 7 is a data flow diagram illustrating an exemplary data and execution flow for processing a search query exchanged via a communications protocol according to an aspect of the subject matter described herein.

FIG. 7 illustrates a search information (searchInfo) dataflow 702 that may be a dataflow internal to requesting execution environment 401a in FIG. 4A and/or may include receiving data via network 510 by requesting execution environment 401a. A search information dataflow 702, in FIG. 7, may include receiving user input information by and/or otherwise identifying user input information to a UI element handler component 423a in communications agent 403a, in response to detecting a user input. A request agent component 402a may receive the search information based on the input information. In another aspect, a search information dataflow may include data identifying search information received by content manager component 417a, in FIG. 4A, via network 510 from, for example, a user agent operating in a node (not shown) in network 510. A request agent component 402a may receive the identified search information via interoperation with content manager component 417a.

Receiving search information may include presenting a first search input UI element to a user, via an output device. The search information may be received from the user via one or more inputs, detected by one or more input devices, where the input(s) correspond to the first search input UI element. The first search input UI element may be presented by a requesting communications agent in a user interface element presented to create a new communicant message; a user interface element presented to reply to a previously received communicant message; a user interface element presented to receive search information where the requesting user is not allowed to create, reply to, and/or otherwise edit a communicant message; and/or a main application window of the requesting communications agent.

FIG. 6A illustrates an exemplary user interface that may be presented to create a new communicant message to send in a communication. The user interface in FIG. 6A may be presented by communications agent 403a, in FIG. 4A, operating in requesting execution environment 401a of requesting node 502 in FIG. 5. A UI element handler component 423a may operate to present a user interface element to allow a user to identify search information. A search information UI element 616a is illustrated in FIG. 6A as an example. The same or different UI element handler component 423a may present various other UI elements included in search information UI element 616a. Search information UI element 616a and one or more UI elements it includes may be presented by one or more corresponding UI element handler component(s) 423a that may operate based on a schema that defines valid search information to create a search query by communications agent 403a. The schema defines one or more rules and/or a vocabulary that defines whether search information is valid.

Those skilled in the art will understand that numerous languages and/or schemas exist and will exist that specify search information. A search input UI element, as described above, may be included in a plurality of search input UI elements presentable by a requesting communications agent. Presenting a search input UI element may include selecting and/or otherwise identifying, based on a search service, the search input UI element from the plurality of search input UI elements. The selected search UI element may be presented in response to and/or otherwise based on the selection. Alternatively or additionally a search UI element may be selected and/or otherwise determined from a plurality of search UI elements, based on a communicant identifier. The communicant identifier identifies a communicant in a communication. The communicant may be contactee and/or a contactor.

A search UI element may be selected based on the requesting user. A search UI element may be selected by a requesting user. Selection information may be received from the user via an input device. The selection information may identify the search input UI element to present.

Search information UI element 616a illustrates a user interface according to a keyword based schema. Match textbox UI element 618a illustrates a textbox allowing a user to enter a keyword expression. An advanced button UI element 620a allows communications agent 403a to receive additional search information typical of advanced searches supported by current search engines. A user input detected that corresponds to advanced button UI element 620a may result in communications agent 403a presenting a dialog box including one or more form UI elements to receive input from the user specifying advanced search options. Communications agent 403a may support more than one search information schema. Thus, a communications agent may provide one or more user interfaces to receive valid search information for a number of respective schemas.

FIG. 6A illustrates a search input UI element 616a integrated with a user interface, create message window 602a, presented to interact with a user to generate a communicant message. Alternatively or additionally, a communications agent may provide a search input UI element integrated in to a main window presented by the communications agent and/or may present a search input UI element in a tab and/or in a dialog box. FIG. 6B illustrates an arrangement of UI elements some or all of which that may be presented as a dialog box, in a tab, and/or in main window of communications agent 403a in FIG. 4A.

As with FIG. 6A, a UI element handler component 423a may operate to present a search information UI element 616b, illustrated in FIG. 6B, in searching window UI element 602b. The same or different UI element handler component 423a may present various other UI elements included in search information UI element 616b. Search information UI element 616b and one or more UI elements it includes may be presented by one or more corresponding UI element handler component(s) 423a that may operate based on a schema that defines valid search information to create a search query by communications agent 403a.

Match textbox UI element 618b illustrates a textbox allowing a user to enter a search expression. An advanced button UI elements 620b may be provided as described above with respect to FIG. 6A. A save button UI element 622b may be provided to receive input information from a user instructing requesting agent 402a to save search information received via search information UI element 616b. A saved button UI element 624b may be provided to receive input information from a user instructing requesting agent 402a to retrieve one or more saved instances of search information and/or a search query. Selection information may be received by communications agent 403a that identifies a saved search to fill in data in search information UI element 616b for the user. One or more identifiers of search services may be presented by a UI element handler 423b. FIGS. 6A-B illustrate search services available from web search engines, a government website, and a photo-sharing web site. Many if not most current service provider systems provide some form of search service. Some are publically available via the Internet while others are accessible to devices operating in the respective service provider systems. An input from a user corresponding to a search service provider, such as Amazon 614b, corresponds to an address of the search service to send a search query.

FIG. 7 illustrates a construct query dataflow 704 that may be a dataflow internal to requesting execution environment 401a in FIG. 4A and/or may include receiving data via network 510 by requesting execution environment 401a. A construct query dataflow may represent an exchange of search information and/or information based on search information received by and/or otherwise identified to a UI element handler component 423a interoperating with request agent component 402a, in FIG. 4A. A construct query dataflow may be performed and/or may occur in response to a user input, detected by communications agent 403a, specified to identify a command to send a search query based on received search information. In another aspect, a construct query dataflow may include an exchange of search information and/or information based on search information received by content manager component 417a and provided to request agent component 402a, via network 510 from, for example, a browser operating as a user agent in a node (not shown) in network 510

A request agent component may be a type of content handler component that operates to process search information to create a search query that conforms to a schema for creating and/or otherwise constructing a valid search query for a search service. The request agent component may transform search information into a search query based on a schema that defines and/or otherwise identifies a valid search query for a particular type of data unit and/or message supported by a communications agent. In FIG. 4A, a search query is constructed and/or otherwise created, based on the search information, by request agent component 402a. Request agent component 402a, operating in requesting execution environment 401a of requesting node 502, may provide the search query to content manager component 417a to include and/or otherwise identify the search query in a message included in one or more data units of a communications protocol in a communication with a communications relay 405 in another execution environment.

As described above, content manager component 417a, in FIG. 4A, may operate in requesting execution environment 401a of requesting node 502 along with a request agent component 402a to transform search information into a search query to include along with data for other parts of a message into one or more data representations suitable for transmitting in a communication to another node, such as relay execution environment 401b of relay node 504 or service execution environment 401c of service node 506. Content manager component 417a in the requesting execution environment 401a may package the one or more data representations including a representation of the search query into a message to transmit via the communications protocol.

In FIG. 8A, a portion of an email communication 800a is illustrated formatted as a multipart/mixed content type including search query portion 802a. A search query portion of a communication may be identified as a search query by its location in the communication and/or by an identifier or markup element, such as a MIME type identifier. A search query may be detected based on content included in the communication and/or based on metadata such as content-type header 804 identifying a MIME type identifier, such as "application/keyword-query", which may be defined to represent one or more matching criteria in a search query. The "application/keyword-query" MIME type identifier is exemplary. Other MIME type identifiers exist and/or may be defined to identify a search query in a communication.

A request agent component 402a and/or a content manager component 417a, in FIG. 4A, may operate to construct a search query in a message and/or a data unit of a communications protocol based on XQuery, a regular expression language, and/or SQL content—to name a few examples. A content type identifier may be included in a position and/or a location that identifies a search query in a communication. The position or location may be absolute or relative. For example, a schema for a communication may define that a search query in a communication is included in the communication at the end of the communication. There may be one or more search queries at the end. In another aspect, a schema for a communication may specify that a portion of a communication following a particular type of message portion is a search query. Other search queries may follow. If no search query is included, the search query portion may include no content or may include an indicator that no search query is included.

FIG. 8A illustrates an "application/keyword-query" MIME type identifier that may be defined to identify a schema for an XML-based language for specifying keyword-query XML documents. FIG. 8A illustrates keyword-query document 806a. Keyword-query document 806a, as illustrated, includes criterion tag elements 808a corresponding to the form elements in a user interface, such as in FIG. 6A and/or form elements in an advanced search user interface element. A criterion tag element 808a identifies a "type" attribute that may be assigned a value, such as "query" indicating that the criterion is a query expression or a portion thereof. A "language" attribute identifies a schema with the identifier "keyword" for the expression. The criterion tag element 808a identifies a value for a query expression "FORM 1040SE" in an expression attribute. Another criterion tag element 808a specifies a scope for resource types identifying that only PDF documents should be identified in a response to the search. FIG. 8A illustrates an "and" tag 810a indicating that all the matching criteria must be met for identifying a matching resource. An "or" tag (not shown) may be defined by a schema for keyword-query documents. Other operator elements and operator precedence may be defined by the schema. Grouping elements for managing operator precedence, such as a parenthesis element, may be defined by the schema.

Returning to FIG. 2A, a block 204 illustrates that the method further includes sending, via a network to a communications service by the first communications agent in a communication including a communicant identifier, a communications request identifying a search query based on the search information. Accordingly, a system for processing a search query exchanged via a communications protocol includes means for sending, via a network to a communications service by the first communications agent in a communication including a communicant identifier, a communications request identifying a search query based on the search information. For example, the arrangement in FIG. 3A, includes com-out component 304 that is operable for and/or is otherwise included in sending, via a network to a communications service by the first communications agent in a communication including a communicant identifier, a communications request identifying a search query based on the search information. FIG. 4A illustrates a com-out component 404 as an adaptation and/or analog of com-out component 304 in FIG. 3A. One or more com-out components 404 operate in an execution environment 401. A system for processing a search query exchanged via a communications protocol includes one or more processors and logic encoded in one or more tangible media for execution by the one or more processors that when executed is operable for and/or is otherwise included in sending, via a network to a communications service by the first communications agent in a communication including a communicant identifier, a communications request identifying a search query based on the search information.

FIG. 7 illustrates a communications request 706 that may be included in whole or in part in a data unit and/or message of a network protocol. The data unit and/or message may be sent via a communications protocol from communications agent 403a operating in requesting execution environment in FIG. 4A via network 510 and received by a communications relay 405 operating as and/or otherwise included in a communication service. The communications relay 405 may forward a query request that identifies and/or is otherwise based on the search query to a search service 409. The search service 409 may be included in a web service and/or in a communications service. A query request may be sent a search service 409 operating in an execution environment with the communications relay 405 and/or may be sent to a search service 409 in another execution environment via a communications request, a web request, and/or a request of another type of network protocol.

Some or all of a communications relay may operate in an execution environment of a service provider system to be searched along with some or all of a search service. Alternatively or additionally, a search service or a portion thereof may operate in an execution environment of a service provider system while a communications relay or a portion thereof may operate in another execution environment. The other execution environment may be an execution environment in the service provider system or may be an execution environment in a system provided by another service provider.

FIG. 4B, illustrates communications relay 405b operating in relay execution environment 401b of relay node 504. Com-out component 404a in requesting execution environment 401a may send a communications request identifying a search query to communications relay 405b operating in a relay execution environment 401b. Communications relay 405b may receive the communications request to send a query request based on the search query to search service 409c operating in service execution environment 401c of service node 506.

FIG. 4C, illustrates communications relay 405c operating in service execution environment 401c of service node 506. Com-out component 404a in requesting execution environment 401a may send a search query to communications relay 405c operating in a service execution environment 401c. Communications relay 405c may receive a search query to send a query request based on the search query to search service 409c operating in service execution environment 401c of service node 506.

Which search service a query request is sent to may be based on a communicant identifier of a communicant identified in the communication that includes the search query. For example, a search query may be included in an email and/or an instant message addressed to a communicant represented by a communications agent including and/or otherwise interoperating with a communications relay 405. Those skilled in the art will understand that the search query may be sent to one or more search services in one or more service provider systems based on one or more communicant identifiers respectively identifying one or more contactees. Com-out component 404a may interoperate with other types of content handler components 421a via content manager component 417a to create and/or otherwise construct a message to send in one or more data units of a communications protocol. The message may include a valid search query.

A search query generated by request agent component 402a, in FIG. 4A, along with a communicant message and any other data to include in a communication, may be provided and/or otherwise identified to content manager component 417a to send via com-out component 404a in the communication. Content manager component 417a in requesting execution environment 401a of requesting node 502 may package the one or more data representations including a representation of the search query into a communications request to transmit according to a communications protocol. Com-out component 404a may provide the search query, the communicant message, and any other data to send in and/or otherwise with the communications request in data representations suitable to send by communications protocol component 415a to a communications agent 403 and/or a communications relay 405 in another execution environment, such as communications relay 405b in relay execution environment 401b of relay node 504. In another aspect, a communications agent and/or a communications relay receiving a communications request identifying a search query may operate in an execution environment with a search service as illustrate by communications relay 405c in service execution environment 401c of service node 506.

Content manager component 417a and/or com-out component 404a, in FIG. 4A, may alternatively or additionally encode and/or otherwise transform one or more of the data representations to send in a data stream such as a voice stream and/or a video stream to communicate in a communication with components of a communications relay 405 in relay execution environment 401b and/or in service execution environment 401c.

A communications request may be sent in a communication along with a communicant message addressed with a contactee communicant identifier. In an aspect, a communications request may be included in a communicant message. For example, a URI or a portion thereof may be included in a communicant message as a communications request. The contactee communicant identifier may be in an address space of a communications protocol via which data is exchanged in the communication. The contactee communicant identifier may identify a communicant represented by a receiving communications agent and/or communications relay. Further, a communicant identifier, in an address space of a communications protocol that identifies a communicant in a communication, may be included in the communication to allow an authentication and/or an authorization operation to be performed for the request.

With reference to FIG. 2B, a block 212 illustrates that the method includes receiving, in a communication that includes a first communicant identifier via a network from a communications agent representing a first communicant and operating in a first execution environment, a communications request that identifies a search query. Accordingly, a system for processing a search query exchanged via a communications protocol includes means for receiving, in a communication that includes a first communicant identifier via a network from a communications agent representing a first communicant and operating in a first execution environment, a communications request that identifies a search query. For example, the arrangement in FIG. 3B, includes request-in component 312 that is operable for and/or is otherwise included in receiving, in a communication that includes a first communicant identifier via a network from a communications agent representing a first communicant and operating in a first execution environment, a communications request that identifies a search query. FIG. 4B and in FIG. 4C illustrate request-in components 412 as adaptations and/or analogs of request-in component 312 in FIG. 3B. One or more request-in components 412 operate in an execution environment 401. A system for processing a search query exchanged via a communications protocol includes one or more processors and logic encoded in one or more tangible media for execution by the one or more processors that when executed is operable for and/or is otherwise included in receiving, in a communication that includes a first communicant identifier via a network from a communications agent representing a first communicant and operating in a first execution environment, a communications request that identifies a search query. In FIG. 4B, request-in component 412b is illustrated as a component of communications relay 405b. In FIG. 4C, request-in component 412c is illustrated as a component of search service 409c. In an aspect, request-in component 412b and request-in component 412c may operate as a distributed request-in component.

FIG. 7, as described above, illustrates communications request dataflow 706, representing a communications request identifying a search query received via network 510 by a request-in component 412 in a communications relay 405 operating as and/or included in a communications service. A communications request may be received by request-in component 412b in communications relay 405b in relay execution environment 401b of relay node 504. In another aspect, a communications request may be received by a request-in component 412c operating in a communications relay 405c in service execution environment 401c along with a search service 409c in a service provider system 508. Communications request dataflow 706 illustrates a communications request sent from requesting execution environment 401a. A receiving request-in component 412 may operate in one or both of relay execution environment 401b and service execution environment 401c.

A communications request may be received by request-in component 412b, in FIG. 4B, via a network interface of relay node 504 in FIG. 5. In another aspect, a communications request may be received via a communications protocol component 415c, in FIG. 4C, via a network interface of service node 506. A request-in component 412 may be included in or may otherwise interoperate with a communications agent representing a communicant identified as a contactee in the communication that includes a search query.

A search query may be received by service execution environment 401c in a service provider system. Some or all of search service may operate in the service execution environment to process the search query. A search query may be received by a communications relay. The communications relay may send a query request based on the search query to a search service in a service provider system 508. Additionally, sending may include creating a search query and/or query request by a translation and/or transformation of a search query identified by a communications request to prepare a search query or a representation thereof suitable for processing by a search service.

In FIG. 4B, request-in component 412b may send a query request identifying and/or otherwise based on a received search query, to a search service 409c via a request gateway component 414, which prepares the search query for the search service 409c. Operation of a request gateway component is described in more detail below. A request gateway component may operate in a same execution environment as a request-in component and/or may be distribute across multiple execution environments. FIG. 4B illustrates request gateway component 414b in communications relay 405b. FIG. 4C illustrates a request gateway component 414c in a separate execution environment than request-in component 412b. In FIG. 4C, request-in component 412c may send a query request based on a received search query to a search service via a request gateway component 414c.

In FIG. 4B, a content manager component 417b may operate to detect a communications request received and/or otherwise identified in one or more messages and/or data units, of a communications protocol, received in a communication. Content manager component 417b operating in relay execution environment 401b may receive the communications request in a communication with requesting execution environment 401a. Com-in component 419b in relay execution environment 401b may receive the data including the communications request via communications protocol component 415b and network stack 413b. The communications request may be delivered to execution environment 401b of relay node 504 via network 510 based on a communicant identifier of a communicant represented by communications relay 405b in relay execution environment 401b of relay node 504.

A communications request data flow may include exchanging data in one or more packets via network 510 by network stack 413b and communications protocol component 415b in an instance of and/or analog of execution environment 401b, in FIG. 4B, including and/or otherwise provided by relay node 504. The data in a communication may be received by com-in component 419b. Com-in component 419b may provide the data to content manager component 417. Content manager component 417 may determine that the data is to be relayed. For example, one or more content types of the data may indicate the data is to be relayed. The content and/or portions of the content may be provided to request-in component 412b based on the one or more content types identified by content manager component 417b.

A content manager component 417b, in FIG. 4B, may detect content type information to detect a search query in and/or identified by a communications request. For example, the communicant message portion illustrated in FIG. 8A may be received in a communications request dataflow. Content manager component 417b may detect "application/keyword-query" MIME type identifier in content-type header 804a. The "application/keyword-query" MIME type identifier may be defined to identify a search query in the communication. Content manager component 417b may identify search query portion 802a as including the search query.

In response to detecting a search query, content manager component 417b may provide some or all of the search query to request-in component 412b. For example, request-in component 412b may operate according to a schema defining a format and/or a vocabulary for an XML-based language for keyword-query documents. Content manager component 417b may provide keyword-query document 806a, as a search query, to request-in component 412b. Request-in component 412b may operate according to the keyword-query schema. In an aspect, a communications relay 405 may process more than one search query content type. A relay execution environment 401b may include multiple request-in components 412b to support multiple search query content types.

As described above, a communications request identifying a search query may be received in a communication along with a communicant message addressed with a contactee communicant identifier, in an address space of a communications protocol via which data is exchanged in the communication. The contactee communicant identifier may identify a communicant to present the communicant message to the communicant via an output device.

A communicant identifier identifying a communicant in the communication may be received to perform an authentication operation and/or an authorization operation for a communications request and/or for a search query identified by a communications request. In an aspect, a communicant message may be delivered to a communicant of communications agent 403b in which communications relay 405b operates. The communications agent 403b may represent the communicant. The communicant may be identified by a communicant identifier received by communications agent 403b in the communications.

For example, FIG. 8A illustrates communicant message portion 812a including "text/plain" MIME type identifier 814a as a content type identifier. Communicant message portion 812a may be provided to a text/plain content handler 421b. Audio data in a voice communication may be provided to an audio content handler component 421b, and video data in a video communication may be provided to a video content handler component 421b, some or all of which may be presented to a communicant identified as a contactee in the communication.

In FIG. 4B, a content manager component 417b may operate to detect a communications request identifying a search query received and/or otherwise identified in a message and/or data unit, of a communications protocol, received in a communication. Content manager component 417b operating in relay execution environment 401b may receive the communications request identifying the search query, in a communication with requesting execution environment 401a. Com-in component 419b in relay execution environment 401b may receive the communications request identifying the search query via communications protocol component 415b and network stack 413b. The communications request identifying the search query may be delivered to execution environment 401b of relay node 504 via network 510 based on a communicant identifier represented by communications relay 405b and/or represented by communications agent 403b in relay execution environment 401b of relay node 504.

FIG. 4C, a communications protocol component 415c may operate to provide data in a data unit and/or message of a communications protocol to request-in component 412c operating in communications relay 405c in service execution environment along with and/or included in search service 409c. Request-in component 412c may operate to detect a search query received and/or otherwise identified in one or more data unit(s) and/or message(s), of the communications protocol. Communications protocol component 415c operating in service execution environment 401c may receive message data in one or more data units transporting the message (not shown) from requesting execution environment 401a to service execution environment 401c in a communication. The message may be delivered via one or more data units of a communications protocol based on a communicant identifier of a communicant represented by service execution environment 401c.

In still another aspect, a query request identifying and/or based on a search query may be received by service execution environment 401c sent from relay execution environment 401b, described in more detail below. Search service 409c may receive the query request from relay execution environment in one or more data units and/or message(s) of a web protocol via network 510. Such a query request is received by search service 409c via web protocol component 433c and application server 439c. The web service may be identified, for example, by a URL in a HTTP request sent via network 510 from relay node 504 to service node 506.

Search service 409c may receive a query request from relay execution environment 401b in a data unit and/or message of a communications protocol via network 510. Such a query request may be received by search service 409c via a communications protocol component 415c and a request-in component 412c. The web service may be identified, for example by a communicant identifier in an email, an instant message, and/or any data unit or message of a suitable communications protocol sent via network 510 from relay node 504 to service node 506.

In an aspect, a communicant message received via communications protocol component 415c may be processed to be presented to a user, identified as a communicant in the communication, of service execution environment. In another aspect, the communicant message may be forwarded to a communications agent that represents an identified contactee, where the communications agent operates in another execution environment included in and/or provided by another node (not shown) operatively coupled to network 510.

As described above, in various aspects, a search query may be detected and/or represented based on various syntaxes, grammars, vocabularies, and/or languages. For example, a search query may be identified and/or represented according to a file system search syntax, a regular expression language, a structured query language (SQL) query, a universal resource identifier schema, an XPath based language, an XQuery based language, an XML based language, an HTML based language, and/or a keyword-value pair based language. A search query or a portion(s) thereof may include at least a portion of one or more of a keyword expression, a regular expression, an expression including a Boolean operator, an expression including precedence information, and a structured query language statement.

Returning to FIG. 2B, a block 214 illustrates that the method further includes sending a query request, based on the search query, to a search service. Accordingly, a system for processing a search query exchanged via a communications protocol includes means for sending a query request, based on the search query, to a search service. For example, the arrangement in FIG. 3B, includes request gateway component 314 that is operable for and/or is otherwise included in sending a query request, based on the search query, to a search service. FIG. 4B and FIG. 4C illustrate request gateway components 414 as an adaptation and/or analog of request gateway component 314 in FIG. 3B. One or more request gateway components 414 operate in an execution environment 401. A system for processing a search query exchanged via a communications protocol includes one or more processors and logic encoded in one or more tangible media for execution by the one or more processors that when executed is operable for and/or is otherwise included in sending a query request, based on the search query, to a search service. In FIG. 4B, request gateway component 414b is illustrated as a component of communications relay 405b. In FIG. 4C, request gateway component 414c is illustrated as a component of search service 409c. In an aspect, request gateway component 414b and request gateway component 414c may operate as a distributed request gateway component.

FIG. 7 illustrates a query request dataflow 708 that may include an exchange of data from a request-in component 412 with a request gateway component 414. Both components may operate at least partially in the same execution environment and/or may operate in different execution environments. Thus a query request dataflow may include an exchange of data within an execution environment and/or between execution environments.

Sending a query request to a search service may include sending a query request, based on a received and/or identified search query, by a communications relay 405 that received a communications request identifying the search query. The communications relay 405 may send the query request to a search service 409. The query request may be exchanged in an execution environment that hosts at least a portion of the communications relay 405 and at least a portion of the search service. The query request may be exchanged via a network between a relay execution environment that hosts at least a portion of the communications relay 405 and a service execution environment that hosts at least a portion of the search service. A query request may be exchanged between a communications relay 405 and a communications service including a search service via a communications protocol 415. In another aspect, a query request may be exchanged between a communications relay 405 and a web service including a search service via a web protocol.

A query request dataflow may include an exchange of data between request-in component 412b operating in relay execution environment 401b and a request gateway component 414c operating in service execution environment 401c, as FIG. 7 illustrates. As described, in another aspect, a query request dataflow may include an exchange of between a request-in component 412b in relay execution environment 401b and a request gateway component 414b in relay execution environment 401b. In still another aspect, a query request dataflow may include an exchange between a request-in component 412c in service execution environment 401b and a request gateway component 414c in service execution environment 401c.

In FIG. 4B, request gateway component 414b may prepare a query request to transmit via a communications protocol to search service 409c. The communications protocol may be the same or different communications protocol by which communications relay 405b received the search query. The search query, suitably represented for transmission via the communications protocol, may be sent via network 510 and received via communications protocol component 415c, such as an email protocol such as version of an SMTP, an IMAP, and/or a POP protocol. The search query may be received by a request gateway component 414c for additional transformation, if needed. The query identified in the query request may be forwarded and/or identified to search-in component 439c directly. In another aspect, the query identified in the query request may be identified to search-in component 439c indirectly. For example, a query request received via communications protocol component 415c may be routed to a request handler component 449c. A request handler component may receive a query request from a request-in component 412c, a request gateway component 414c, and/or a communications protocol component 415c when one or more are included in a service execution environment 401c, in various aspects. A request handler component 449c may include instructions to process query requests received via communications protocol component 415c.

With respect to FIG. 4C, request-in component 412c may process a search query received via communications protocol component 415c from requesting execution environment 401a. Request-in component 412c as describe above may be a query request based on the search query to request gateway component 414c which operates on the query to prepare and/or otherwise transform the search query into a query request suitable for processing by the search service 409c. In particular, request gateway component 414c may prepare and/or otherwise transform a search query into a query request suitable for processing by search-in component 439c.

An exchange of data between a request gateway component and a search service may occur internal to an execution environment, such as an exchange between request gateway component 414c and search service 409c in FIG. 4C. The exchange may include an exchange via a web protocol and/or communications protocol as described above. Alternatively or additionally, an exchange of data between a request gateway component and a search service may occur between execution environments, such as an exchange between request gateway component 414b in relay execution environment 401b and search service 409c in service execution environment 401c in FIG. 4C.

With respect to FIG. 4B, request gateway component 414b may send a query request to search service 409c by preparing and/or otherwise transforming the search query as received via a communications protocol to a query request for processing by search service 409c. Request gateway component 414b may prepare the search query to transmit a query request including a representation of the search query to search service 409c. A query request identifying and/or based on a search query may be received by a request handler component 449c. Request handler component 449c may receive the suitably formatted query request query, for example, in a HTTP request via an application server 437c. Request handler component 449c identifies a suitable component, illustrated by search-in component 439c for a query request, to process the query request identified in the HTTP request.

FIG. 7 illustrates a search dataflow 710 that may include a dataflow internal to service execution environment 401c in FIG. 4C. In an aspect, a search dataflow may include an exchange of data between search-in component 439c and query parser component 451c. A search dataflow may include an exchange of data between search service 409c and another node (not shown), in other aspects.

A query request and/or a suitable representation of the search query may be received by search-in component 439c from a request handler component 449c or via communications relay 405c. Search-in component 439c may validate the query request and prepare it for tokenizing by a query parser component 451c. In an aspect, search-in component 439c may attempt to correct possible errors such as misspelled words and/or missing precedence operators. Search-in component may modify a query request based on a communicant identifier included in sending a corresponding communications request by a requesting communications agent. A search-in component may identify a related query request and/or related terms to add and/or substitute in the query request to add to and/or remove from the query request.

Query parser component 451c may provide and/or otherwise identify the parsed query request to search director component 447c. Search director component 447c may access an index data store 441c to access an index created by service backend 411c to locate one or more matching resources. A match may be referred to as a "hit". In an aspect, an index to search may be identified based on one or more communicant identifier included in sending a corresponding communications request that identified the search query for the query request. Analogously, one or more indices may be excluded from a search operation based on the communicant identifier(s).

Search director 447c may provide one or more hits to hit generator component 453c to sort, organize, and generate presentation information for one or more pages or results to present to a user. Hit generator component 453c may interoperate with a rank component 455c to sort hits by one or more specified criteria. In an aspect, hit generator component 453c and/or search director component 447c may stop processing of query request based on a time threshold and/or based on a threshold for a number of hits detected—to name just two examples. Stopping the query request may enhance response time in responding to the sender of the query request. Search director may perform one or more operations based on one or more communicant identifiers included in sending a corresponding communications request associated with the query request.

Returning to FIG. 2B, a block 216 illustrates that the method yet further includes receiving a query response from the search service. Accordingly, a system for processing a search query exchanged via a communications protocol includes means for receiving a query response from the search service. For example, the arrangement in FIG. 3B, includes response-in component 316 that is operable for and/or is otherwise included in receiving a query response from the search service. FIG. 4B and FIG. 4C illustrate response-in components 416 as adaptations and/or analogs of response-in component 316 in FIG. 3B. One or more response-in components 416 operate in an execution environment 401. A system for processing a search query exchanged via a communications protocol includes one or more processors and logic encoded in one or more tangible media for execution by the one or more processors that when executed is operable for and/or is otherwise included in receiving a query response from the search service. In FIG. 4B, response-in component 416b is illustrated as a component of communications relay 405b. In FIG. 4C, response-in component 416c is illustrated as a component of search service 409c. In an aspect, response-in component 416b and response-in component 416c may operate as a distributed response-in component.

Query response dataflow 712 may include an exchange of data in an execution environment that hosts at least a portion of a communications relay 405 and at least a portion of a search service 409. A query response dataflow may include an exchange of data via a network between a relay execution environment 401b that hosts at least a portion of the communications relay 405 and a service execution environment 401*c* that hosts at least a portion of the search service 409*c*. A query response dataflow may include an exchange of data via a communications protocol. A query response dataflow may include an exchange of data via a web protocol. Alternatively or additionally, a query response dataflow may include an exchange of data via another network protocol. A query response may identifies a search result generated by performing a search based on a search query.

A search result may identify a resource based on one or more communicant identifiers identified in a communications request that identifies a search query from which the search result was generated. Likewise, a search result may identify a resource based on one or more communicant identifiers identified in a communications request that identifies a corresponding search query.

In response to receiving a search query, a request-in component 412 and/or a request gateway component 414 may, based on one or more communicant identifiers identified in a communications request that identifies the search query, send a query request, based on the search query, to a search service and/or may exclude a search service by not sending the query request to the excluded search service. Similarly, in another aspect, a search service included in processing a search query may access a search index or a portion thereof and/or not access a search index or a portion thereof based on one or more communicant identifiers identified in a communications request that identifies the search query.

For example, a retail or wholesale provider search service may search an index or portion thereof that includes items for sale based on a communicant identifier identified in a communications request. An index may be searched that identifies items at different prices than are available based on another communicant identifier not identified in the communications request. A search index may identify services, accessories, and related items based on a communicant identifier. For a business user, documents may be identified based on a communicant identifier of the requesting communicant and/or based on a communicant identifier that a communications relay represents. For example, a communicant identifier provided to IT professionals may identify new documents, drivers, and/or other downloads as email attachments, links, and/or otherwise referenced in a search result that are not provided to communicant identifiers not categorized as identifying IT professionals. Thus a search result may identify a resource or "hit" not identified by a search result for the same search query received along with a different communicant identifier.

In various aspects, a search result based on a first communicant identifier or a first set of communicant identifiers may differ from a search result based on a second communicant identifier or a second set of communicant identifiers based a format of some or all of the respective search results, languages of the respective search results, and/or data represented via different content types in the respective search results. For example, while a first search result based on a first communicant identifier may be represented in and/or as a HTML document, a second search result based on a second communicant identifier may be represented in and/or as a PDF document or a spreadsheet which may be returned to a requesting communications agent as an attachment. In still another aspect, while a search query from a first communicant may require a response in a first time period that differs from a response required for the search query for a second communicant.

Multiple search results search query sent by a communications agent may be generated at regular intervals or generated based on an event that may occur at irregular intervals based on a communicant identifier associated with the search query. Such operation may be preconfigured and/or identified in and/or with a search query based on a communicant identifier.

One or more of a request-in component, a request gateway component, a search director, a search index, and a response-in component and/or a response gateway component may be included in processing a search query based on a first communicant identifier to generate a search result that differs from a search result generated for the search request based on a second communicant identifier.

Returning to FIG. 2B, a block 218 illustrates that the method yet further includes sending, via the network to the first execution environment, a communications response that identifies, based on the first communicant identifier and the query response, a communications search result. Accordingly, a system for processing a search query exchanged via a communications protocol includes means for sending, via the network to the first execution environment, a communications response that identifies, based on the first communicant identifier and the query response, a communications search result. For example, the arrangement in FIG. 3B, includes response gateway component 318 that is operable for and/or is otherwise included in sending, via the network to the first execution environment, a communications response that identifies, based on the first communicant identifier and the query response, a communications search result. FIG. 4B and FIG. 4C illustrate response gateway components 418 as adaptations and/or analogs of response gateway component 318 in FIG. 3B. One or more response gateway components 418 operate in an execution environment 401. A system for processing a search query exchanged via a communications protocol includes one or more processors and logic encoded in one or more tangible media for execution by the one or more processors that when executed is operable for and/or is otherwise included in sending, via the network to the first execution environment, a communications response that identifies, based on the first communicant identifier and the query response, a communications search result. In FIG. 4B, response gateway component 418*b* is illustrated as a component of communications relay 405*b*. In FIG. 4C, response gateway component 418*c* is illustrated as a component of search service 409*c*. In an aspect, response gateway component 418*b* and response gateway component 418*c* may operate as a distributed response gateway component.

Returning to FIG. 2A, a block 206 illustrates that the method yet further includes receiving, by the first execution environment in response to the sending of the communications request, a communications response that identifies a communications search result determined based on the communicant identifier. Accordingly, a system for processing a search query exchanged via a communications protocol includes means for receiving, by the first execution environment in response to the sending of the communications request, a communications response that identifies a communications search result determined based on the communicant identifier. For example, the arrangement in FIG. 3 includes response director component 306 that is operable for and/or is otherwise included in receiving, by the first execution environment in response to the sending of the communications request, a communications response that identifies a communications search result determined based on the communicant identifier. FIG. 4A illustrates a response director component 406a as an adaptation and/or analog of response director component 306 in FIG. 3. One or more response director components 406 operate in an execution environment 401. A system for processing a search query exchanged via a communications protocol includes one or more processors and logic encoded in one or more tangible media for execution by the one or more processors that when executed is operable for and/or is otherwise included in receiving, by the first execution environment in response to the sending of the communications request, a communications response that identifies a communications search result determined based on the communicant identifier Generating a communications response may include receiving a query response by a communications relay from a search service included in generating the search result. The communications relay may receive the query response in response to sending a query request based on the search query. The query response may be exchanged in an execution environment that hosts at least a portion of a communications relay and at least a portion of a search service. A query response includes some or all of a search result and/or otherwise identifies part or all of a search result.

In FIG. 4C, hit generator component 453c may identify and/or otherwise provide some or all of a generated search result to response-in component 416c. Response-in component 416c may perform additional filtering, sorting, and/or formatting of the search result that was not performed by hit generator 453c. Search services may vary in such functionality. Further, response-in component 416c may prepare information received from hit generator component 453c to identify to response gateway component 418c to indicate whether to use a web protocol, a communications protocol, and/or some other type of available network protocol to send a communications response identifying some or all of the search result.

In FIG. 4C, one or more messages, identifying some or all of a search result and/or identifying a location where some or all of the search result may be accessed, may be received via communications protocol component 415b and/or may be received via web protocol component 433b from one or more search services. Data in the messages may be provided and/or identified to request-in component 412b via content manager component 409b and/or via direct interaction with a protocol component. Request-in component 412b may identify and/or otherwise provide some or all of a generated search result to response-in component 416b. Response-in component 416b may perform one or more operations analogous to those described in the preceding paragraph for response-in component 416c.

A query response may be exchanged via a network between a relay execution environment 401b that hosts at least a portion of a communications relay and a service execution environment 401c that hosts at least a portion of a web service including a search service. The query response may be exchanged via a communications protocol. The query response may be exchanged via a web protocol. The exchange may occur between response-in component 416c in service execution environment 401c and response-in component 416b in relay execution environment 401b. Additional search services 409 in other execution environments may exchange search result data with response-in component 416b in relay execution environment 401b. Response-in component 416b may build a communications response based on search result(s) from one or more search services 409.

FIG. 7 illustrates a communications response dataflow 714 that may include a data exchange via network 510 between communications relay 405b in FIG. 4B and a requesting execution environment 401a. The exchange may include an exchange between response gateway component 418b in relay execution environment 401b and a response director component 406a in requesting execution environment 401a. In another aspect, a communications response dataflow may include a data exchange via network 510 between service execution environment 401c in FIG. 4C and requesting execution environment 401a. The exchange may include an exchange between response gateway component 418c in service execution environment 401b and a response director component 406a in requesting execution environment 401a. In still another aspect, a communications response dataflow may include a data exchange via network 510 between service execution environment 401c in FIG. 4C and relay execution environment 401b. The exchange may include an exchange between response gateway component 418c in service execution environment 401b and a suitable protocol component in relay execution environment 401b included in relaying and/or forwarding to response director component 406a in requesting execution environment 401a. A communications response dataflow may include an exchange via a web protocol, via a communications protocol, and/or via some other type of suitable network protocol.

Sending a communications response may include sending the communications response by a communications relay. The communications response may be sent automatically in response to receiving the query response and/or other data from the search service identifying some or all of a search result. The communications response may be sent via a web protocol. The communications response may be sent via a communications protocol. The communications response may be sent via some other network protocol. The communications response may include at least a portion of the search result.

In FIG. 4C, response gateway component 418c may package a communications response to transmit the communications response to requesting execution environment 401a via network 510. Response gateway component 418c may send a communications response via web protocol component 433c. A communications response may be received by user agent 407a via web protocol component 433a in requesting execution environment 401a. A communications response may be sent asynchronously or may be a response to a request from user agent 407a. For example, communications agent 403a may receive a link to access a search result identified in, for example, an email or instant message sent from response gateway component 418c via communications protocol component 415c in service execution environment 401c. User agent 407a may send a request based the link to receive the communications response.

Response gateway component 418c, in FIG. 4C, may send a communications response via communications protocol component 415c addressed to the requesting user represented by communications agent 403a, in FIG. 4A. A communications response may be received by communications agent 403a via communications protocol component 415a in requesting execution environment 401a. For example, communications agent 403a may receive a link in a communications response in an email or MMS message sent from response gateway component 418c via communications protocol component 415c in service execution environment 401c.

A communications response may be received by a communications relay. Some or all of a portion of each of the communications relay and a search service operate in an execution environment of a service provider system. Some or all of a communications relay may operate in an execution environment in which a search service of the service provider system does not operate.

In FIG. 4B, response gateway component 418b may send a communications response via communications protocol component 415b addressed to the requesting user represented by communications agent 403a in requesting execution environment 401a. The communications response may be received by communications agent 403a via communications protocol component 415a in requesting execution environment 401a as described in the previous paragraph.

Receiving a communications response may include receiving the communications response in a communication along with a communicant message addressed with a communicant identifier of the requesting user. The communicant identifier may be included in an address space of a communications protocol. The communications protocol may be the communications protocol via which the corresponding search query was sent by a communications agent representing the requesting user. In an aspect, the communicant identifier may be in an address space of another protocol. The communications response may be received via the same or a different communications protocol by which the search query was sent.

Some or all of a communications search result received by a requesting communications agent may be presented via an output device. If a communicant message is received with a communications response, the communicant message may be presented to the user with a representation of search result information.

The methods illustrated in FIG. 2A-B may include additional aspects supported by various adaptations and/or analogs of the arrangement of components in FIG. 3A-B. In various aspects, performing the method illustrated in FIG. 2A-B and/or any of its extensions and/or in any of its aspects may include one or more of calling a function or method of an object, sending data via a network; sending data via an inter-process communication mechanism such as a pipe, a semaphore, a shared data area, and/or a queue; and/or receiving a request such as poll and responding to invoke, and sending data via an asynchronous protocol.

To the accomplishment of the foregoing and related ends, the descriptions and annexed drawings set forth certain illustrative aspects and implementations of the disclosure. These are indicative of but a few of the various ways in which one or more aspects of the disclosure may be employed. The other aspects, advantages, and novel features of the disclosure will become apparent from the detailed description included herein when considered in conjunction with the annexed drawings.

It should be understood that the various components illustrated in the various block diagrams represent logical components that operate to perform the functionality described herein and may be implemented in software, hardware, or a combination of the two. Moreover, some or all of these logical components may be combined, some may be omitted altogether, and additional components may be added while still achieving the functionality described herein. Thus, the subject matter described herein may be embodied in many different variations, and all such variations are contemplated to be within the scope of what is claimed.

To facilitate an understanding of the subject matter described above, many aspects are described in terms of sequences of actions that may be performed by elements of a computer system. For example, it will be recognized that the various actions may be performed by specialized circuits or circuitry (e.g., discrete logic gates interconnected to perform a specialized function), by program instructions being executed by one or more processors, or by a combination of both. The description herein of any sequence of actions is not intended to imply that the specific order described for performing that sequence must be followed.

Moreover, the methods described herein may be embodied in executable instructions stored in a non-transitory computer readable medium for use by or in connection with an instruction execution machine, system, apparatus, or device, such as a computer-based or processor-containing machine, system, apparatus, or device. As used here, a "non-transitory computer readable medium" may include one or more of any suitable media for storing the executable instructions of a computer program in one or more forms including an electronic, magnetic, optical, and electromagnetic form, such that the instruction execution machine, system, apparatus, or device may read (or fetch) the instructions from the non-transitory computer readable medium and execute the instructions for carrying out the described methods. A non-exhaustive list of conventional exemplary non-transitory computer readable media includes a portable computer diskette; a random access memory (RAM); a read only memory (ROM); an erasable programmable read only memory (EPROM or Flash memory); optical storage devices, including a portable compact disc (CD), a portable digital video disc (DVD), a high definition DVD (HD-DVD™), and a Blu-Ray™ disc; and the like.

Thus, the subject matter described herein may be embodied in many different forms, and all such forms are contemplated to be within the scope of what is claimed. It will be understood that various details may be changed without departing from the scope of the claimed subject matter. Furthermore, the foregoing description is for the purpose of illustration only, and not for the purpose of limitation, as the scope of protection sought is defined by the claims as set forth hereinafter together with any equivalents.

All methods described herein may be performed in any order unless otherwise indicated herein explicitly or by context. The use of the terms "a" and "an" and "the" and similar referents in the context of the foregoing description and in the context of the following claims are to be construed to include the singular and the plural, unless otherwise indicated herein explicitly or clearly contradicted by context. The foregoing description is not to be interpreted as indicating that any non-claimed element is essential to the practice of the subject matter as claimed.

I claim:

1. A computer-implemented method, comprising:
   creating at least a portion of an instant messaging application that is configured to cooperate with a relay that is configured to communicate with a web service, the instant messaging application, when executed, configured to cause a device, that includes at least one processor and non-transitory memory, to:
   display an instant messaging interface including a textbox user interface element for receiving a message text portion and a send user interface element for sending the message text portion in response to a user selection thereof,
   receive, from the relay and utilizing a communications agent on the device configured to receive incoming messages addressed to a communicant identifier associated with a user of the instant messaging application, a first message,
   in response to the receipt, from the relay and utilizing the communications agent on the device configured to receive the incoming messages addressed to the communicant identifier associated with the user of the instant messaging application, of the first message: display, via the instant messaging interface, at least a portion of the first message;

after the display, via the instant messaging interface, of the least portion of the first message: receive, via the textbox user interface element of the instant messaging interface, text that is received as a reply to the first message, after the receipt, via the textbox user interface element of the instant messaging interface, of the text: receive, via the instant messaging interface, an indication of a selection on the send user interface element of the instant messaging interface, in response to the receipt, via the instant messaging interface, of the indication of the selection on the send user interface element of the instant messaging interface:

send, to the relay and utilizing the communications agent on the device configured to send outgoing messages addressed from the communicant identifier associated with the user of the instant messaging application, a second message including the text and an automatically determined contactee identifier, for causing the relay to:

send, from the relay to the web service, a third message including the text, for causing the web service to:

send, to the relay, a fourth message with at least one image that is identified based on the text, for causing the relay to:

send, to the device, a fifth message including the at least one image, receive, from the relay and utilizing the communications agent on the device configured to receive the incoming messages addressed to the communicant identifier associated with the user of the instant messaging application, the fifth message including the at least one image, and in response to the receipt, from the relay and utilizing the communications agent on the device configured to receive the incoming messages addressed to the communicant identifier associated with the user of the instant messaging application, of the fifth message including the at least one image: display, via the instant messaging interface, the at least one image; and causing storage of the at least portion of the instant messaging application.

2. The computer-implemented method of claim 1, wherein the at least one image is automatically included with the fourth message based on the text.

3. The computer-implemented method of claim 1, wherein the instant messaging application is configured such that, when executed, the text are displayed, via the instant messaging interface, as the reply to the first message.

4. The computer-implemented method of claim 1, wherein the instant messaging application is configured such that, when executed, the contactee identifier is automatically identified based on a template.

5. The computer-implemented method of claim 1, wherein the instant messaging application is configured such that, when executed, the text is included in search information and the second message includes a search query based on the search information.

6. The computer-implemented method of claim 1, wherein the instant messaging application, when executed, is configured to cause the device to:

display a button with the at least one image, receive, via the instant messaging interface, an indication of a selection on the button displayed via the instant messaging interface, in response to the receipt, via the instant messaging interface, of the indication of the selection on the button displayed via the instant messaging interface: generate a request corresponding to the button displayed via the instant messaging interface, in response to the generation of the request corresponding to the button displayed via the instant messaging interface: send, to the relay and utilizing the communications agent on the device configured to send the outgoing messages addressed from the communicant identifier associated with the user of the instant messaging application, a sixth message that includes the request, after sending, to the relay and utilizing the communications agent on the device configured to send the outgoing messages addressed from the communicant identifier associated with the user of the instant messaging application, the sixth message that includes the request: receive, from the relay and utilizing the communications agent on the device configured to receive the incoming messages addressed to the communicant identifier associated with the user of the instant messaging application, a seventh message, after sending, to the relay and utilizing the communications agent on the device configured to send the outgoing messages addressed from the communicant identifier associated with the user of the instant messaging application, the sixth message that includes the request: receive, from the relay and utilizing the communications agent on the device configured to receive the incoming messages addressed to the communicant identifier associated with the user of the instant messaging application, a response including at least one additional image, the response being attached to the seventh message, and in response to the receipt, from the relay and utilizing the communications agent on the device configured to receive the incoming messages addressed to the communicant identifier associated with the user of the instant messaging application, of the seventh message and the response including the at least one additional image: display, via the instant messaging interface, the at least one additional image.

7. The computer-implemented method of claim 1, wherein:

the instant messaging application is configured to utilize the communications agent on the device to communicate the incoming messages when the user is a contactee and the outgoing messages when the user is a contactor, utilizing a communications protocol, such that the incoming messages and the outgoing messages are addressed using the communicant identifier which takes the form of a communication address associated with a communicant alias corresponding to the user; and the instant messaging interface is configured to simultaneously display at least a portion of at least one of the incoming messages and at least a portion of at least one of the outgoing messages in a form of a conversation which is simultaneously displayed with at least a por-

47 tion of the at least one image, where the at least one image is displayed to be part of the conversation.

8. The computer-implemented method of claim 7, wherein the communications protocol includes a real-time, store and forward, instant messaging, request/reply protocol on top of a Transmission Control Protocol/Internet Protocol (TCP/IP), and the relay communicates with the web service utilizing a hypertext transfer protocol (HTTP).

9. The computer-implemented method of claim 1, wherein at least one of:
- the at least portion of the instant messaging application includes an entirety of the instant messaging application;
- the device includes at least one of a personal computer or a mobile device;
- the at least portion of the instant messaging application is created by a development thereof;
- the instant messaging application is configured to cooperate with the relay by communicating with the relay;
- the instant messaging application is configured such that interaction therewith is capable of invoking a network browser application;
- the relay is equipped with another communications agent;
- the communicant identifier includes at least one of a contactor identifier or a contactee identifier;
- in each instance of an operation including at least one of the displaying or the sending, in response to the receiving, the operation occurs in immediate response to the receiving;
- in each instance of an operation including at least one of the displaying or the sending, in response to the receiving, the operation occurs after at least one intermediate operation that occurs in immediate response to the receiving;
- each instance of receiving includes receiving, from the relay, that which was received by the relay from the web service;
- each instance of sending includes sending, to the relay, that which is sent by the relay to the web service;
- the communications agent is separate from the instant messaging application;
- the communications agent is integrated with the instant messaging application;
- the communications agent receives the incoming messages and sends the outgoing messages;
- the incoming messages include automatically generated messages and the outgoing messages include messages edited by the user;
- the incoming messages include automatically generated messages and the outgoing messages include messages prompted by the user;
- the outgoing messages include the second message;
- the incoming messages include the first message and the fifth message;
- the addressing is automatic;
- the addressing is manual;
- the send user interface element includes a forward user interface element;
- the send user interface element includes the word "send";
- the first message includes an initial message;
- the first message is communicated first, the second message is communicated second, the third message is communicated third, the fourth message is communicated fourth, and the fifth message is communicated fifth;

48

- no intermediate messages are communicated between the communication of the first message, the second message, the third message, the fourth message, and the fifth message;
- at least one intermediate message is communicated between the communication of at least two of: the first message, the second message, the third message, the fourth message, and the fifth message;
- the text is part of an expression;
- the text is part of search information;
- the textbox user interface element includes a search input user interface element; or
- the at least portion of the instant messaging application is part of a system, where the system further comprises the relay and the device.

10. A non-transitory computer-readable media storing computer instructions of an instant messaging application, that when executed by one or more processors of a device, cause the one or more processors to:
- display an instant messaging interface including a textbox user interface element for receiving a message text portion and a send user interface element for sending the message text portion in response to a user selection thereof,
- receive, from a relay and utilizing a communications agent on the device configured to receive incoming messages addressed to a communicant identifier associated with a user of the instant messaging application, a first message,
- in response to the receipt, from the relay and utilizing the communications agent on the device configured to receive the incoming messages addressed to the communicant identifier associated with the user of the instant messaging application, of the first message: display, via the instant messaging interface, at least a portion of the first message;
- after the display, via the instant messaging interface, of the least portion of the first message: receive, via the textbox user interface element of the instant messaging interface, text that is received as a reply to the first message,
- after the receipt, via the textbox user interface element of the instant messaging interface, of the text: receive, via the instant messaging interface, an indication of a selection on the send user interface element of the instant messaging interface,
- in response to the receipt, via the instant messaging interface, of the indication of the selection on the send user interface element of the instant messaging interface:
  - send, to the relay and utilizing the communications agent on the device configured to send outgoing messages addressed from the communicant identifier associated with the user of the instant messaging application, a second message including the text and an automatically determined contactee identifier, for causing the relay to:
    - send, from the relay to a web service, a third message including the text, for causing the web service to:
      - send, to the relay, a fourth message including at least one image that is located based on the text, for causing the relay to:
        - send, to the device, a fifth message including the at least one image,
- receive, from the relay and utilizing the communications agent on the device configured to receive the incoming messages addressed to the communicant identifier associated with the user of the instant messaging application, the fifth message including the at least one image, and in response to the receipt, from the relay and utilizing the communications agent on the device configured to receive the incoming messages addressed to the communicant identifier associated with the user of the instant messaging application, of the fifth message including the at least one image: display, via the instant messaging interface, the at least one image.

11. The non-transitory computer-readable media of claim 10, wherein:

the instant messaging application is configured to utilize the communications agent on the device to communicate the incoming messages when the user is a contactee and the outgoing messages when the user is a contactor, utilizing a communications protocol, such that the incoming messages and the outgoing messages are addressed using the communicant identifier which takes the form of a communication address associated with a communicant alias corresponding to the user; and the instant messaging interface is configured to simultaneously display at least a portion of at least one of the incoming messages and at least a portion of at least one of the outgoing messages in a form of a conversation which is simultaneously displayed with at least a portion of the at least one image.

12. The non-transitory computer-readable media of claim 11, wherein the communications protocol includes a real-time, store and forward, instant messaging, request/reply protocol on top of a Transmission Control Protocol/Internet Protocol (TCP/IP), and the relay communicates with the web service utilizing a hypertext transfer protocol (HTTP).

13. The non-transitory computer-readable media of claim 11, wherein:

the at least one image is automatically located based on the text;

the text is displayed, via the instant messaging interface, as the reply to the first message; and the instant messaging application, when executed, is configured such that the contactee identifier is automatically identified.

14. The non-transitory computer-readable media of claim 13, wherein the text is included as part of search information and the second message includes a search query based on the search information.

15. The non-transitory computer-readable media of claim 14, wherein the instant messaging application, when executed, is configured to cause the device to:

display a button with the at least one image, receive, via the instant messaging interface, an indication of a selection on the button displayed via the instant messaging interface, in response to the receipt, via the instant messaging interface, of the indication of the selection on the button displayed via the instant messaging interface: generate a request corresponding to the button displayed via the instant messaging interface, in response to the generation of the request corresponding to the button displayed via the instant messaging interface: send, to the relay and utilizing the communications agent on the device configured to send the outgoing messages addressed from the communicant identifier associated with the user of the instant messaging application, a sixth message that includes the request, after sending, to the relay and utilizing the communications agent on the device configured to send the outgoing messages addressed from the communicant identifier associated with the user of the instant messaging application, the sixth message that includes the request: receive, from the relay and utilizing the communications agent on the device configured to receive the incoming messages addressed to the communicant identifier associated with the user of the instant messaging application, a seventh message, after sending, to the relay and utilizing the communications agent on the device configured to send the outgoing messages addressed from the communicant identifier associated with the user of the instant messaging application, the sixth message that includes the request: receive, from the relay and utilizing the communications agent on the device configured to receive the incoming messages addressed to the communicant identifier associated with the user of the instant messaging application, a response including at least one additional image, the response being attached to the seventh message, and in response to the receipt, from the relay and utilizing the communications agent on the device configured to receive the incoming messages addressed to the communicant identifier associated with the user of the instant messaging application, of the seventh message and the response including the at least one additional image: display, via the instant messaging interface, the at least one additional image.

16. A computer-implemented method, comprising:

creating at least a portion of an instant messaging application that is configured to cooperate with a relay, the instant messaging application, when executed, configured to cause a device, that includes at least one processor and non-transitory memory, to:

display an instant messaging interface including a textbox user interface element for receiving editable text, a send user interface element for sending the text in response to a user selection thereof, and an uneditable user interface element, receive, via the textbox user interface element of the instant messaging interface, an editable set of text, after the receipt, via the textbox user interface element of the instant messaging interface, the editable set of text: receive, via the instant messaging interface, an indication of a selection on the send user interface element of the instant messaging interface, in response to the receipt, via the instant messaging interface, of the indication of the selection on the send user interface element of the instant messaging interface: generate a first request message that includes the editable set of text, in response to the generation of the first request message that includes the editable set of text: send, to the relay and with a communicant identifier associated with a user of the instant messaging application, the first request message that includes the editable set of text, after sending, to the relay and with the communicant identifier associated with the user of the instant messaging application, the first request message that includes the editable set of text: receive, from the relay and with the communicant identifier associated with the user of the instant messaging application, a first response including at least one first image that is automatically located based on the editable set of text of the first request message;

in response to the receipt, from the relay and with the communicant identifier associated with the user of the instant messaging application, of the first response including the at least one first image that is automatically located based on the editable set of text of the first request message: display, via the instant messaging interface, the at least one first image, receive, via the instant messaging interface, an indication of a selection on the uneditable user interface element of the instant messaging interface, in response to the receipt, via the instant messaging interface, of the indication of the selection on the uneditable user interface element of the instant messaging interface: generate a second request message, in response to the generation of the second request message: send, to the relay and with the communicant identifier associated with a user of the instant messaging application, the second request message, after sending, to the relay and with the communicant identifier associated with the user of the instant messaging application, the second request message: receive, from the relay and with the communicant identifier associated with the user of the instant messaging application, a second response including at least one second image that is automatically located based on the second request message, and in response to the receipt, from the relay and with the communicant identifier associated with the user of the instant messaging application, of the second response including the at least one second image that is automatically located based on the second request message: display, via the instant messaging interface, the at least one second image; and causing storage of the at least portion of the instant messaging application.

17. The computer-implemented method of claim 16, wherein the instant messaging application is configured such that, when executed, the uneditable user interface element is based on an instant message previously received, from the relay, at the device.

18. The computer-implemented method of claim 16, wherein the instant messaging application is configured such that, when executed, the uneditable user interface element is part of a dynamic portion of the instant messaging interface that displays the at least one first image, the at least one second image, the first request message, and the second request message as instant messages in a conversation; and the textbox user interface element and the send user interface element are part of a static portion of the instant messaging interface such that the textbox user interface element and the send user interface element are displayed independent of the instant messages in the conversation.

19. The computer-implemented method of claim 18, wherein the instant messaging application is configured such that, when executed, the uneditable user interface element is displayed as an instant message in the dynamic portion of the instant messaging interface as part of the instant messages in the conversation.

20. A non-transitory computer-readable media storing computer instructions of an instant messaging application, that when executed by one or more processors of a device, cause the one or more processors to:

display an instant messaging interface including a textbox user interface element for receiving editable text, a send user interface element for sending the text in response to a user selection thereof, and an uneditable user interface element, receive, via the textbox user interface element of the instant messaging interface, an editable set of text, after the receipt, via the textbox user interface element of the instant messaging interface, the editable set of text: receive, via the instant messaging interface, an indication of a selection on the send user interface element of the instant messaging interface, in response to the receipt, via the instant messaging interface, of the indication of the selection on the send user interface element of the instant messaging interface: generate a first request message that includes the editable set of text, in response to the generation of the first request message that includes the editable set of text: send, to an apparatus and with a communicant identifier associated with a user of the instant messaging application, the first request message that includes the editable set of text, after sending, to the apparatus and with the communicant identifier associated with the user of the instant messaging application, the first request message that includes the editable set of text: receive, from the apparatus and with the communicant identifier associated with the user of the instant messaging application, a first response including at least one first image that is automatically located based on the editable set of text of the first request message;

in response to the receipt, from the apparatus and with the communicant identifier associated with the user of the instant messaging application, of the first response including the at least one first image that is automatically located based on the editable set of text of the first request message: display, via the instant messaging interface, the at least one first image, receive, via the instant messaging interface, an indication of a selection on the uneditable user interface element of the instant messaging interface, in response to the receipt, via the instant messaging interface, of the indication of the selection on the uneditable user interface element of the instant messaging interface: generate a second request message, in response to the generation of the second request message: send, to the apparatus and with the communicant identifier associated with a user of the instant messaging application, the second request message, after sending, to the apparatus and with the communicant identifier associated with the user of the instant messaging application, the second request message: receive, from the apparatus and with the communicant identifier associated with the user of the instant messaging application, a second response including at least one second image that is automatically located based on the second request message, and in response to the receipt, from the apparatus and with the communicant identifier associated with the user of the instant messaging application, of the second response including the at least one second image that is automatically located based on the second request message: display, via the instant messaging interface, the at least one second image.

21. The non-transitory computer-readable media of claim 20, wherein the instant messaging application is configured such that, when executed, the uneditable user interface element is based on an instant message previously received, from the apparatus, at the device.

22. The non-transitory computer-readable media of claim 20, wherein the instant messaging application is configured such that, when executed, the uneditable user interface element is part of a dynamic portion of the instant messaging interface that displays the at least one first image, the at least one second image, the first request message, and the second request message as instant messages in a conversation; and the textbox user interface element and the send user interface element are part of a static portion of the instant messaging interface such that the textbox user interface element and the send user interface element are displayed independent of the instant messages in the conversation.

23. The non-transitory computer-readable media of claim 22, wherein the instant messaging application is configured such that, when executed, the uneditable user interface element is displayed as an instant message in the dynamic portion of the instant messaging interface as part of the instant messages in the conversation.

24. The non-transitory computer-readable media of claim 23, wherein the instant messaging application is configured to utilize a first communications agent on the device to communicate incoming messages when the user is a contactee and outgoing messages when the user is a contactor, utilizing a communications protocol, such that the incoming messages and the outgoing messages are addressed using the communicant identifier which takes the form of a communication address associated with a communicant alias corresponding to the user.

25. The non-transitory computer-readable media of claim 24, wherein the communications protocol includes a real-time, store and forward, instant messaging, request/reply protocol on top of a Transmission Control Protocol/Internet Protocol (TCP/IP), and the apparatus communicates with a web service utilizing a hypertext transfer protocol (HTTP).

26. The non-transitory computer-readable media of claim 24, wherein the communications protocol includes a publish-subscribe protocol on top of a Transmission Control Protocol/Internet Protocol (TCP/IP).

27. The non-transitory computer-readable media of claim 26, wherein the publish-subscribe protocol includes an Extensible Messaging and Presence Protocol (XMPP).

28. The non-transitory computer-readable media of claim 24, wherein the instant messaging application is configured such that the first communications agent on the device is capable of communicating with a second communications agent using another communicant identifier which takes the form of another communication address.

29. The non-transitory computer-readable media of claim 28, wherein the second communications agent is on the apparatus.

30. The non-transitory computer-readable media of claim 28, wherein the second communications agent is part of a web service that is in communication with the device via the apparatus, where the apparatus includes a relay.

* * * * *